United States Patent
Ishii et al.

(10) Patent No.: US 6,831,448 B2
(45) Date of Patent: Dec. 14, 2004

(54) DC-TO-DC CONVERTER

(75) Inventors: Takuya Ishii, Suita (JP); Hiroshi Saito, Tokyo (JP); Hironori Kamiya, Takatsuki (JP); Takashi Ryu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 70 days.

(21) Appl. No.: 10/427,487

(22) Filed: May 1, 2003

(65) Prior Publication Data

US 2003/0210025 A1 Nov. 13, 2003

(30) Foreign Application Priority Data

May 9, 2002 (JP) ..................................... 2002-134683

(51) Int. Cl.[7] .............................................. G05F 1/40
(52) U.S. Cl. ..................................... 323/282; 323/272
(58) Field of Search ................................. 323/271, 272, 323/282, 284, 285, 268, 266, 283; 363/24, 25, 124, 70, 81, 97

(56) References Cited

U.S. PATENT DOCUMENTS

| | | | |
|---|---|---|---|
| 4,395,675 A | | 7/1983 | Toumani |
| 4,578,630 A | * | 3/1986 | Grosch ....................... 323/271 |
| 5,422,562 A | | 6/1995 | Mammano et al. |
| 5,528,125 A | * | 6/1996 | Marshall et al. ............. 323/222 |
| 5,844,399 A | * | 12/1998 | Stuart .......................... 323/282 |
| 6,087,816 A | * | 7/2000 | Volk ............................ 323/282 |
| 6,232,755 B1 | * | 5/2001 | Zhang ......................... 323/282 |
| 6,580,258 B2 | * | 6/2003 | Wilcox et al. ............... 323/282 |
| 6,774,611 B2 | * | 8/2004 | Umminger et al. ......... 323/282 |

FOREIGN PATENT DOCUMENTS

JP 55068877 A 5/1980

* cited by examiner

Primary Examiner—Rajnikant B. Patel
(74) Attorney, Agent, or Firm—Akin Gump Strauss Hauer & Feld, L.L.P.

(57) ABSTRACT

In order to increase the transient response speed of a DC-to-DC converter capable of voltage step-up and voltage step-down, to which a DC voltage is input from a battery or the like and from which a controlled DC voltage is supplied to a load, a first voltage E1 lower than an output setting voltage Eset by a predetermined voltage is defined and is compared with a DC output voltage Eo by a first comparator, and the result of the comparison is output. @a A second voltage E2 lower than a DC input voltage Ei by a predetermined voltage is defined and is compared with the DC output voltage Eo by a second comparator 133, and the result of the comparison is also output. When the results of the comparisons are represented by Eo<E1 and Eo<E2, a switch connected between the input and the output is turned ON. This configuration greatly increases the response speed at the time when the DC output voltage Eo reaches the output setting voltage Eset.

12 Claims, 16 Drawing Sheets

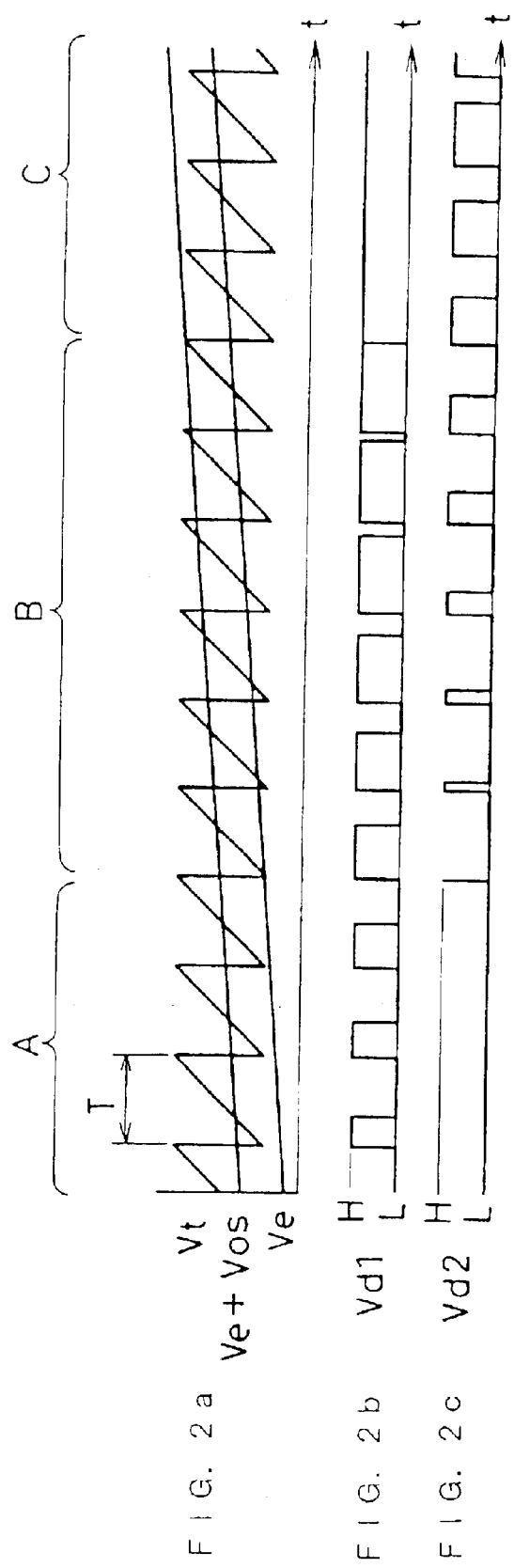

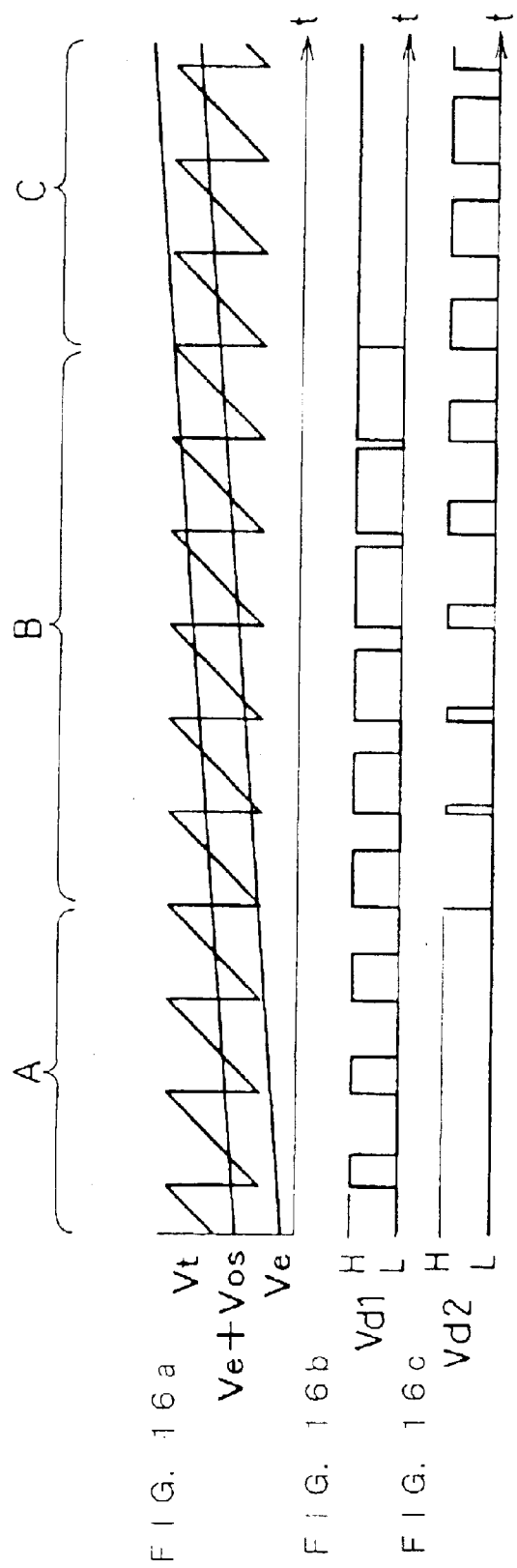

DC-TO-DC CONVERTER

The present invention relates to a DC-to-DC converter which receives a DC voltage from a battery or the like and supplies a controlled DC voltage to a load, and more particularly to a DC-to-DC converter capable of carrying out voltage step-up and step-down operation in an input-output noninverting manner in which the polarity of the input voltage is the same as that of the output voltage.

BACKGROUND OF THE INVENTION

A DC-to-DC converter which receives a DC voltage from a battery or the like and supplies a DC voltage obtained by voltage step-up or step-down operation in an input-output noninverting manner is disclosed in the Japanese Publication of examined patent application No. Sho 58-40913. FIG. 13 is the circuit diagram of the DC-to-DC converter disclosed in the Japanese Publication of examined patent application No. Sho 58-40913. FIG. 14a to FIG. 14d are waveform diagrams showing the operation of the DC-to-DC converter.

In the DC-to-DC converter shown in FIG. 13, the cathode of a first diode 3 is connected via a first switch 2 to the positive pole 1A of a DC input power source 1 generating a DC voltage Ei. The anode of the diode 3 is connected to the negative pole 1B of the DC input power source 1. One terminal of a second switch 5 is connected to the cathode of the diode 3 via an inductor 4. The other terminal of the second switch 5 is connected to the negative pole 1B. The switches 2 and 5 are formed of switches capable of turning on and turning off at a high frequency, such as a semiconductor switch. The anode of a second diode 6 is connected to the connection point of the inductor 4 and the switch 5, and its cathode is connected to the negative pole 1B via an output capacitor 7. A load 8 is connected in parallel with the output capacitor 7, and a DC output voltage Eo across both the terminals of the output capacitor 7 is applied to the load 8. As shown in FIG. 14a and FIG. 14b, the first switch 2 and the second switch 5 turn on and turn off in the same constant switching period T. The ratio of the ON time period of the switch 2 to one switching period T is designated by $\delta 1$, which is a duty ratio in the switch 2. The ratio of the ON time period of the switch 5 to one switching period T is designated by $\delta 2$, which is a duty ratio in the switch 5. The duty ratio $\delta 1$ is made larger than the duty ratio $\delta 2$ as shown in the figures. The ratio of the ON time period is referred to as a duty ratio when represented by percentage. For convenience in explanation, it is assumed that the diodes 3 and 6 have no forward voltage drops in the conductive states.

When both the switch 2 and the switch 5 are in ON-state, the voltage Ei of the DC input power source 1 is applied to the inductor 4. The time period of this voltage application is represented by $\delta 2 \cdot T$ as shown in FIG. 14b. At this time, current flows from the DC input power source 1 to the inductor 4, whereby magnetic energy is stored. Subsequently, when the switch 5 turns OFF, the diode 6 becomes conductive (turns ON) as shown in FIG. 14d, and the voltage difference (Ei–Eo) between the DC input voltage Ei and the DC output voltage Eo is applied to the inductor 4. The time period of this voltage application is represented by $(\delta 1-\delta 2) \cdot T$. During this application time period, current flows from the DC input power source 1 to the output capacitor 7 via the inductor 4. Then, when the switch 2 turns OFF, the diode 3 turns ON as shown in FIG. 14c, and the DC output voltage Eo is applied to the inductor 4 in the inverse direction. The time period of this voltage application is represented by $(1-\delta 1) \cdot T$. During this application time period, current flows from the inductor 4 to the output capacitor 7, whereby the stored magnetic energy is released.

By repeating the storage and release of the magnetic energy as described above, electric power is supplied from the output capacitor 7 to the load 8. In a stable operation state wherein the storage and release of the magnetic energy of the inductor 4 are balanced with each other, the sum of the integrals of the voltages with respect to time is zero, whereby Equation (1) is established.

$$Ei \cdot \delta 2 \cdot T + (Ei-Eo)(\delta 1-\delta 2)T = Eo(1-\delta 1)T \qquad (1)$$

By arranging Equation (1), Equation (2) is obtained.

$$Eo = \frac{\delta 1}{1 - \delta 2} \cdot Ei \qquad (2)$$

Equation (2) represents a conversion characteristic. When $\delta 2 = 0$, Equation (2) renders Equation (3), whereby the converter operates as a voltage step-down converter.

$$Eo = \delta 1 \cdot Ei \qquad (3)$$

When $\delta 1 = 1$, Equation (2) becomes Equation (4), whereby the converter operates as a voltage step-up converter.

$$Eo = \frac{1}{1 - \delta 2} \cdot Ei \qquad (4)$$

By controlling the duty ratios of the switches 2 and 5, the value of $\delta 1/(1-\delta 2)$ in Equation (2) can be set at any given value in the range of from zero (0) to infinity. Hence, this DC-to-DC converter serves theoretically as a voltage step-up and step-down converter capable of obtaining a desired DC output voltage Eo from the DC input voltage Ei having any given value. For example, U.S. Pat. No. 4,395,675 discloses a DC-to-DC converter controlling the duty ratios of two switches.

FIG. 15 shows a circuit example of a conventionally well-known DC-to-DC converter including a control section 9 for controlling the duty ratios of the switches 2 and 5. FIG. 16a to FIG. 16c are waveform diagrams showing the waveforms of signals at various parts thereof.

In FIG. 15, an error amplification circuit 20 in the control section 9 includes a reference voltage source 200 and resistors 201 and 202 which are connected in series for detecting the DC output voltage Eo. The error amplification circuit 20 includes also an error amplifier 203 whereto are inputted the reference voltage Er of the reference voltage source 200 and a detection voltage Ed obtained by voltage division of the DC output voltage Eo by using the resistors 201 and 202. A phase compensating capacitor 204 is connected across the input and output terminals of the error amplifier 203, and an error voltage Ve is output from the output terminal. An oscillation circuit 11 outputs a sawtooth voltage Vt which increases and decreases alternately between two values at a predetermined period. The period of the sawtooth voltage Vt is represented by T and the amplitude thereof is represented by $\Delta Vt$. The level of the voltage rises linearly and drops sharply. A pulse-width control circuit 12 includes an adder 120 for adding a predetermined offset voltage Vos to the error voltage Ve, a first comparator 121 for comparing the output voltage (Ve+Vos) of the adder 120 with the sawtooth voltage Vt, and a second comparator 122 for comparing the error voltage Ve with the sawtooth voltage Vt. The output of the comparator 121 is a first drive signal Vd1 for turning ON and turning OFF the first switch 2; the output of the comparator 122 is a second drive signal Vd2 for turning ON and turning OFF the second switch 5.

The waveform diagram of FIG. 16a shows the sawtooth voltage Vt, the error voltage Ve and the output voltage (Ve+Vos) of the adder 120. FIG. 16b and FIG. 16c show the first drive signal Vd1 and the second drive signal Vd2, respectively. In a left end portion A of the waveform diagram of FIG. 16a, the sawtooth voltage Vt is higher than the error voltage Ve, and the waveform of the sawtooth voltage Vt intersects the waveform of the output voltage (Ve+Vos). In a central portion B, the waveform of the sawtooth voltage Vt intersects the waveform of the error voltage Ve and the waveform of the output voltage (Ve+Vos). In a right end portion C, the sawtooth voltage Vt is lower than the output voltage (Ve+Vos).

The operation of the control section 9 shown in FIG. 15 will be described below referring to FIG. 16a to FIG. 16c. When the detection voltage Ed obtained by dividing the DC output voltage Eo by using the resistors 201 and 202 rises and becomes higher than the reference voltage Er of the reference voltage source 200, the error voltage Ve output from the error amplification circuit 20 lowers, and vice versa. In other words, when the DC output voltage Eo rises owing to the rising of the DC input voltage Ei or the decrease of the load 8, the error voltage Ve lowers. On the other hand, when the DC output voltage Eo lowers owing to the lowering of the DC input voltage Ei or the increase of the load 8, the error voltage Ve rises.

First, when the DC input voltage Ei is high and the sawtooth voltage Vt is higher than the error voltage Ve as shown in the range A of FIG. 16a, the drive signal Vd2 remains a logical L level (hereafter simply referred to as "L"), whereby the switch 5 remains OFF state. Hence, the duty ratio $\delta 2$ or the switch 5 is zero ($\delta 2=0$). The switch 2 is turned ON and turned OFF alternately by the drive signal Vd1, and the duty ratio $\delta 1$ becomes smaller as the error voltage Ve lowers. In this case, the relationship between the DC input voltage Ei and the DC output voltage Eo of the DC-to-DC converter is represented by Equation (3), and the DC-to-DC converter operates as a voltage step-down converter.

Next, when the difference between the DC input voltage Ei and the DC output voltage Eo is small and the waveform of the sawtooth voltage Vt intersects the waveform of the error voltage Ve and the waveform of the output voltage (Ve+Vos) of the adder 120 as shown in the range B of FIG. 16a, the switch 2 makes alternate ON-OFF action by the drive signal Vd1, and the switch 5 makes alternate ON-OFF action by the drive signal Vd2. The duty ratio $\delta 1$ and the duty ratio $\delta 2$ become smaller as the error voltage Ve become lower. In this case, the relationship between the DC input voltage Ei and the DC output voltage Eo of the DC-to-DC converter is represented by Equation (2), and the DC-to-DC converter operates as a voltage step-up and step-down converter.

When the DC input voltage Ei is low and when the sawtooth voltage Vt is lower than the output voltage (Ve+Vos) as shown in the range C of FIG. 16a, the drive signal Vd1 remains a logical H level (hereafter simply referred to as "H"), whereby the switch 2 remains ON state. Hence, the duty ratio $\delta 1$ of the switch 2 is 1 ($\delta 1=1$). On the other hand, the duty ratio $\delta 2$ of the switch 5 increases as the error voltage Ve rises. In this case, the relationship between the DC input voltage Ei and the DC output voltage Eo of the DC-to-DC converter is represented by Equation (4), and the DC-to-DC converter operates as a voltage step-up converter.

The DC-to-DC converter capable of carrying out voltage step-up and step-down operation has a high flexibility in the setting of the DC output voltage. Therefore, the DC-to-DC converter is occasionally used so that the setting value of the DC output voltage is changed depending on the state of the load. In this case, the reference voltage Er of the reference voltage source 200 is changed depending on a signal from the load 8. When the reference voltage Er is changed, it is preferable that the DC output voltage Eo is changed depending on the change of the reference voltage Er at a high "response speed". In the above-mentioned conventional DC-to-DC converter, the response speed depends on the changing speed of the error voltage Ve output from the error amplifier 203. In a control system of the DC-to-DC converter, in order to secure stability, the phase compensating capacitor 204 is connected across the input terminal and the output terminal of the error amplifier 203, for example. By the connection of the phase compensating capacitor 204, the response speed of the error amplifier 203 lowers and its cutoff frequency generally lowers to one several tenths of its switching frequency. The switching frequency is usually several tens to several hundreds of kHz. Hence, the response time of the DC-to-DC converter is several hundred microseconds when the reference voltage changes stepwise. The response time of several hundred microseconds is not sufficiently short for application of the DC-to-DC converter to various electronic apparatuses. There is a problem that the DC-to-DC converter cannot sufficiently cope with load changes in various electronic apparatuses.

BRIEF SUMMARY OF THE INVENTION

An object of the present invention is to solve the above-mentioned problem and to provide a DC-to-DC converter having an improved response speed and being capable of voltage step-up and step-down operation.

The DC-to-DC converter in accordance with the present invention controls a DC output voltage so as to become equal to a predetermined output setting voltage by raising or lowering the DC output voltage with respect to a DC input voltage. The DC-to-DC converter comprises switches for switching a DC current inputted from an input terminal, an inductor which stores and releases electromagnetic energy generated by current switched on and off by the switches, an error amplification circuit for outputting an error voltage obtained by comparing a DC output voltage obtained by rectifying and smoothing a voltage generated at the output terminal of the inductor with a predetermined reference voltage, and a pulse-width control circuit for controlling the switching operation of the switches on the basis of the error voltage. The DC-to-DC converter further comprises a charging switch connected between the input terminal and the output terminal thereof, a first comparison circuit for comparing a first voltage lower than the output setting voltage with the DC output voltage and for obtaining the output of a comparison result, a second comparison circuit for comparing a second voltage lower than the DC input voltage with the DC output voltage and for obtaining the output of a comparison result, and a drive circuit for receiving the output of the first comparison circuit and the output of the second comparison circuit and for turning ON the charging switch when the DC output voltage is lower than the first voltage and the second voltage.

According to the present invention, the charging switch is provided for making and breaking the connection between the input terminal and the output terminal of the DC-to-DC converter. In a control section wherein the first voltage lower than the output setting voltage by a predetermined voltage and the second voltage lower than the DC input voltage by a predetermined voltage are set, when the DC output voltage is lower than the first voltage and the second voltage, the charging switch is turned ON. Hence, in the case that the DC output voltage becomes lower than the output setting voltage owing to an external factor, the response speed to rise the DC output voltage so as to reach the output setting voltage can be greatly increased.

The DC-to-DC converter in accordance with the present invention comprises a voltage application section to which the output of the first comparison circuit is input. The voltage application section changes the error voltage so that the pulse-width control circuit turns ON and OFF the switches at the maximum duty ratios, when the DC output voltage is lower than the first voltage.

In the case that the output setting voltage is higher than the DC input voltage and the DC output voltage is lower than the first voltage, the DC-to-DC converter is operated at its maximum output. The operation is continued so that the maximum output is delivered after the charging switch is turned OFF and until the DC output voltage reaches the first voltage. Hence, it is possible to obtain an effect capable of further shortening the response time.

The drive circuit of the DC-to-DC converter in accordance with the present invention comprises a first maximum ON time period setting circuit for setting a predetermined maximum value at the ON time period of the charging switch.

By providing a limit for the maximum value of the ON time period of the charging switch, the drive circuit has a protection function for preventing the charging switch from breaking even if the charging switch turns ON when the load is shorted.

A DC-to-DC converter in accordance with another aspect of the present invention, for the sake of converting a DC input voltage applied to an input terminal and outputting a desired DC output voltage from an output terminal, comprises a switch for making and breaking the connection between the input terminal and the output terminal, and a control section for setting a first voltage lower than an output setting voltage of a desired value in the DC output voltage and a second voltage lower than the input voltage, and for closing the switch when the DC output voltage is lower than the first voltage and the second voltage.

According to the present invention, when the DC output voltage lowers at the output terminal and becomes lower than the first and second voltages, the switch connected between the input terminal and the output terminal of the DC-to-DC converter is turned ON. Hence, current is directly supplied from the input terminal to the output terminal, whereby the voltage at the output terminal can be raised quickly.

A DC-to-DC converter in accordance with another aspect of the present invention, for the sake of converting a DC input voltage applied to an input terminal and outputting a desired DC output voltage from an output terminal, comprises a switch for making and breaking the connection between the input terminal and the output terminal, and a control section for setting a first voltage lower than an output setting voltage of a desired value in the DC output voltage and a second voltage lower than the input voltage, and for closing the switch when the DC output voltage is lower than the first voltage and the second voltage. A discharging switch is connected across both the output terminals, and the discharging-switch is turned ON when the DC output voltage is higher than a third voltage set at a value higher than the output setting voltage.

In the DC-to-DC converter in accordance with the present invention, the third voltage is set so as to be higher than the output setting voltage by a predetermined voltage, and the discharging switch is turned ON when the output setting voltage is higher than the third voltage. Hence, in the case that the DC output voltage becomes higher than the output setting voltage owing to a factor, the response speed to rise the DC output voltage so as to reach the output setting voltage can be greatly increased.

In addition, the DC-to-DC converter in accordance with the present invention further comprises means for limiting the ON time period of the discharging switch at a predetermined maximum limit.

By providing the maximum limit in the ON time period of the discharging switch, the discharging switch can be protected so as not to break even if the discharging switch turns ON when the DC output voltage rises abnormally.

A DC-to-DC converter in accordance with another aspect of the present invention comprises switches for switching a current inputted from an input terminal, an inductor which stores and releases electromagnetic energy generated depending on the current switched on and off by the switches, and a capacitor charged by the current obtained by the storage and release of the electromagnetic energy of the inductor, and for obtaining a DC output voltage at output terminals. The DC-to-DC converter further comprises an error amplification circuit for comparing the DC output voltage with a predetermined reference voltage and for outputting an error voltage, a pulse-width control circuit for applying pulse signals having predetermined duty ratios to the switches and for controlling the duty ratios so that the DC output voltage becomes a desired voltage on the basis of the error voltage, a comparison circuit for comparing the DC output voltage with the predetermined reference voltage and for outputting a signal obtained as the result of the comparison, when the DC output voltage becomes higher than the desired voltage, and a discharging switch driven by the signal obtained as the result of the comparison made by the comparison circuit, and for discharging the capacitor.

According to the present invention, when the DC output voltage at the output terminal becomes higher than the desired voltage, the discharging, switch is driven, whereby the capacitor is discharged, and the DC output voltage can be lowered quickly.

BRIEF DESCRIPTION OF THE SEVERAL VIEWS OF THE DRAWING

FIG. 2a to FIG. 2c are waveform diagrams showing the waveforms of signals at various parts of the control section of the DC-to-DC converter in accordance with the first embodiment of the present invention;

FIG. 16a to FIG. 16c are waveform diagrams showing the waveforms of signals at various parts of the control section of the DC-to-DC converter shown in FIG. 15.

DETAILED DESCRIPTION OF THE INVENTION

DC-to-DC converters in accordance with preferred embodiments of the present invention will be described below referring to FIG. 1 to FIG. 12e.

<<First Embodiment>>

A DC-to-DC converter in accordance with a first embodiment of the present invention will be described below referring to FIG. 1 to FIG. 4d.

Figure 1:
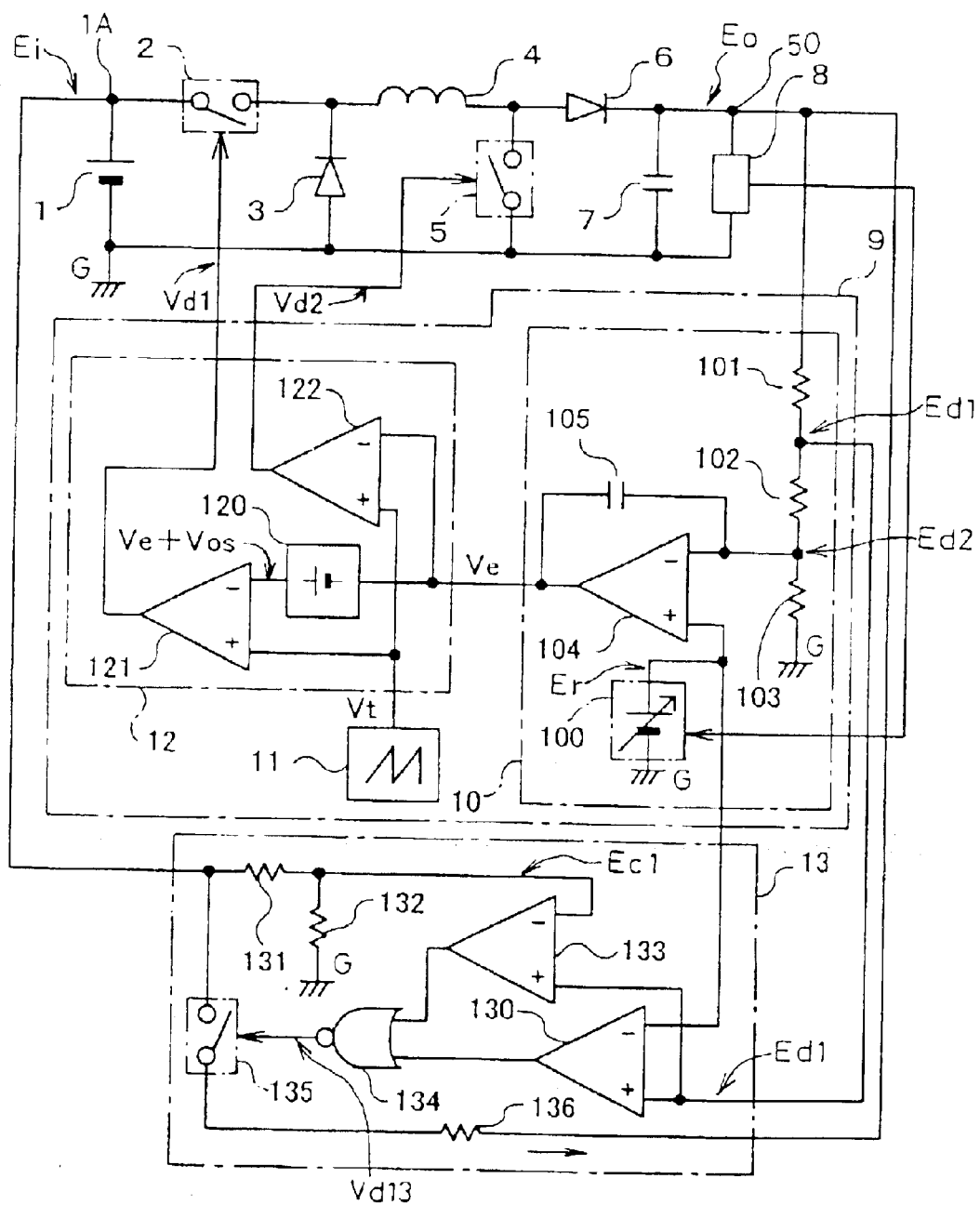
FIG. 1 is a circuit diagram of a DC-to-DC converter in accordance with a first embodiment of the present invention.

FIG. 1 is a circuit diagram of the DC-to-DC converter in accordance with the first embodiment of the present invention. In FIG. 1, the cathode of a first diode 3 is connected through a first switch 2 to the positive pole 1A of a DC input power source 1 generating a DC voltage Ei. The anode of the diode 3 is connected to a circuit ground G connected to the negative pole of the DC input power source 1. One terminal of a second switch 5 is connected to the cathode of the diode 3 via an inductor 4, and the other terminal of the switch 5 is connected to the circuit ground G. The switches 2 and 5 are formed of a semiconductor switch for example, and are turned ON and turned OFF by drive signals Vd1 and Vd2 applied from a control section 9, respectively. The anode of a second diode 6 is connected to the connection point of the inductor 4 and the switch 5, and the cathode of the diode 6 is connected to the circuit ground G via an output capacitor 7. A load 8 is connected across the output terminal 50 of the positive pole of the output capacitor 7 and the circuit ground G, and the DC output voltage Eo at both the terminals of the output capacitor 7 is applied to the load 8. The DC output voltage Eo is supplied to the error amplification circuit 10 of the control section 9.

In the error amplification circuit 10, resistors 101, 102 and 103 are connected in series in this order between the output terminal 50 and the circuit ground G. The connection point of the resistors 102 and 103 is connected to the inverting input terminal of an error amplifier 104, and a voltage Ed2 generated at the connection point is applied to the inverting input terminal. The positive reference voltage Er of a variable-voltage type reference voltage source 100 is applied to the noninverting input terminal of the error amplifier 104. The error amplifier 104 outputs an error voltage Ve.

Figure 15:
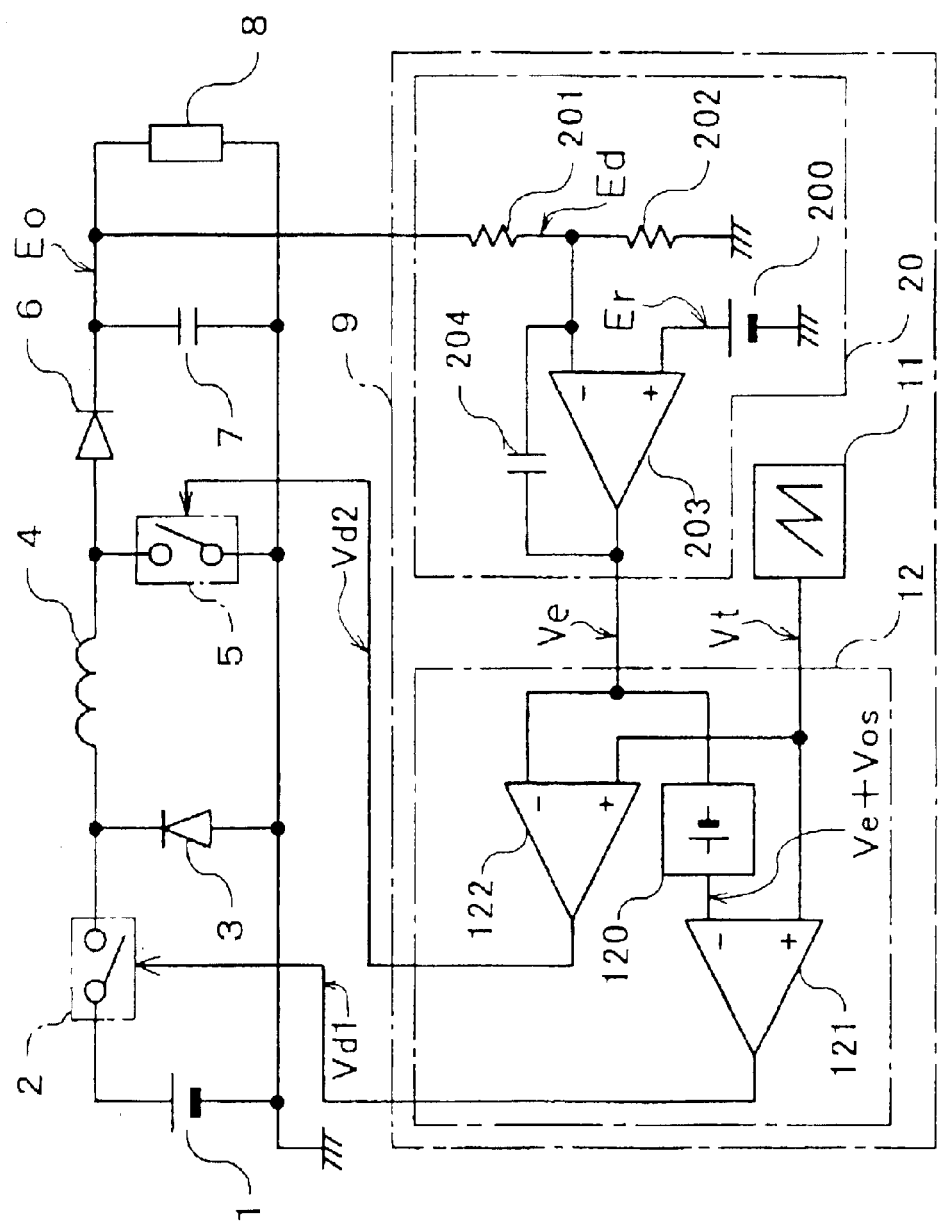
FIG. 15 is the circuit diagram of the conventional DC-to-DC converter.

The reference voltage Er of the reference voltage source 100 is changed in a range lower than the DC input voltage Ei by a control signal of a control section (not shown) provided in the load 8. The reference voltage Er may be controlled by a circuit other than the control section provided in the load 8, for example, an external circuit. A phase compensating capacitor 105 is connected across the inverting input terminal and the output terminal of the error amplifier 104. By connecting this phase compensating capacitor 105, the response speed of the error amplifier 104 is made similar to that of the error amplifier 203 shown in FIG. 15.

The output terminal of the error amplifier 104 is connected to the inverting input terminal of a comparator 122 in a pulse-width control circuit 12, and the error voltage Ve is applied to the inverting input terminal. The output terminal of the error amplifier 104 is also connected to the inverting input terminal of a comparator 121 through an adder 120. The adder 120 adds a predetermined offset voltage Vos to the error voltage Ve output from the error amplifier 104 and applies the voltage (Ve+Vos) obtained as the result of the addition to the inverting input terminal of the comparator 121. The output terminal of an oscillation circuit 11 is connected to the noninverting input terminals of the comparators 121 and 122. The oscillation circuit 11 outputs a sawtooth voltage Vt having an amplitude of ΔVt and iterating at a period T, and the level of which rises linearly and drops sharply after reaching a constant level. A first drive signal Vd1 output from the comparator 121 is applied to the switch 2 to control the opening and closing thereof. A second drive signal Vd2 output from the comparator 122 is applied to the switch 5 to control the opening and closing thereof.

A detection voltage Ed1 obtained by dividing the DC output voltage Eo by the resistors 101, 102 and 103 in the error amplification circuit 10 is applied to the noninverting input terminal of a comparator 130 serving as a first comparison circuit and also applied to the noninverting input terminal of a comparator 133 serving as a second comparison circuit in a response speedup circuit 13. The reference voltage Er of the reference voltage source 100 is applied to the inverting input terminal of the comparator 130. The response speedup circuit 13 is a circuit peculiar to the present embodiment. The response speed of the DC-to-DC converter is increased by the response speedup circuit 13 as described below in detail.

The inverting input terminal of the comparator 133 is connected to the positive pole 1A of the DC input power source 1 via a resistor 131 and also connected to the circuit ground G via a resistor 132. The voltage of the inverting input terminal of the comparator 133 is represented by Ec1. The output terminals of the comparators 130 and 133 are connected to the two input terminals of a NOR circuit 134, respectively. The output terminal of the NOR circuit 134 is connected to the control input terminal of a switch 135.

The switch 135 is connected between the output terminal 50 and the positive pole 1A of the DC input power source 1 via a resistor 136. The switch 135 is formed of a semiconductor switch or the like that is opened and closed by a drive signal Vd13 output from the NOR circuit 134. As described later, when the switch 135 is closed, the positive pole 1A of the DC input power source 1 is connected to the output terminal 50. By this connection, the capacitor 7 is charged by current supplied from the DC input power source 1 when the DC output voltage Eo is lower than the DC input voltage Ei. Hence, the switch 135 is hereafter referred to as a "charging switch 135".

The operation of the DC-to-DC converter in accordance with this embodiment will be described below referring to FIGS. 2 and 3.

Terms used in the description of the operation of this embodiment will be described below.

The DC output voltage Eo is a voltage at the output terminal 50.

An output setting voltage Eset is the target value of the DC output voltage Eo and is set to a desired voltage value of the load 8 by a setting circuit (not shown) in the load 8, for example, a voltage setting circuit including a memory and a reference power source. The reference voltage Er of the reference voltage source 100 is changeable by a control section (not shown) provided in the load 8. In the load 8, the output setting voltage Eset and the reference voltage Er have been set beforehand in a table or the like so as to have a predetermined relationship therebetween, whereby the reference voltage Er corresponding to a desired value of the output setting voltage Eset is set in the reference voltage source 100.

The pulse-width control circuit 12 generates the drive signals Vd1 and Vd2 from the sawtooth voltage signal Vt of the oscillation circuit 11 and applies them to the switches 2 and 5, respectively.

When both the switches 2 and 5 are closed (hereafter referred to as ON) by the drive signals Vd1 and Vd2 of the pulse-width control circuit 12, the DC input voltage Ei is applied to the inductor 4, and a magnetic energy is stored in the inductor 4. Subsequently, when the switch 5 is turned OFF, the diode 6 is conductive, a current flows from the DC input power source 1 to the capacitor 7 via the inductor 4. Then, when the switch 2 is turned OFF, the diode 3 becomes conductive, and a current flows from the inductor 4 to the capacitor 7 so as to release the stored magnetic energy. Since the diode 3, the inductor 4 and the diode 6 are connected in series and both the diode 3 and the diode 6 are conductive, the voltage of the inductor 4 is applied to the output capacitor 7.

In the case when the detection voltage Ed2 at the connection point of the resistors 102 and 103 becomes equal to the reference voltage Er in the error amplification circuit 10, the DC output voltage Eo becomes equal to the output setting voltage Eset. The output setting voltage Eset is the target value of the DC output voltage Eo. Hence, the reference voltage Er is determined so that the DC output voltage Eo is equal to the output setting voltage Eset.

The DC output voltage Eo in the case when the detection voltage Ed1 at the connection point of the resistors 101 and 102 becomes equal to the reference voltage Er is referred to as a "first voltage E1". The first voltage E1 is lower than the output setting voltage Eset which is the DC output voltage Eo in the case when the detection voltage Ed2 becomes equal to the reference voltage Er. The comparator 130 compares the reference voltage Er with the detection voltage Ed1. When the detection voltage Ed1 is higher than the reference voltage Er, the comparator 130 outputs a logical H level signal (hereafter simply referred to as "H"). As a result, the comparator 130 indirectly compares the DC output voltage Eo with the first voltage E1. The comparator 130 corresponds to the first comparison circuit. The DC output voltage Eo obtained at the time when the voltage Ec1 at the connection point of the resistors 131 and 132 becomes equal to the detection voltage Ed1 is referred to as a "second voltage E2". The second voltage E2 is set so as to be lower than the DC input voltage Ei by a predetermined voltage. The comparator 133 indirectly compares the DC input voltage with the DC output voltage of the DC-to-DC converter and outputs "H" when the DC output voltage Eo is higher than the second voltage E2. The switch 135 is driven by the output of the NOR circuit 134 serving as a first drive circuit.

The operation of the DC-to-DC converter in the first embodiment will be described below in detail. First, description is made as to the operation in the case of a steady state wherein the load 8 is constant and does not change.

Figure 13:
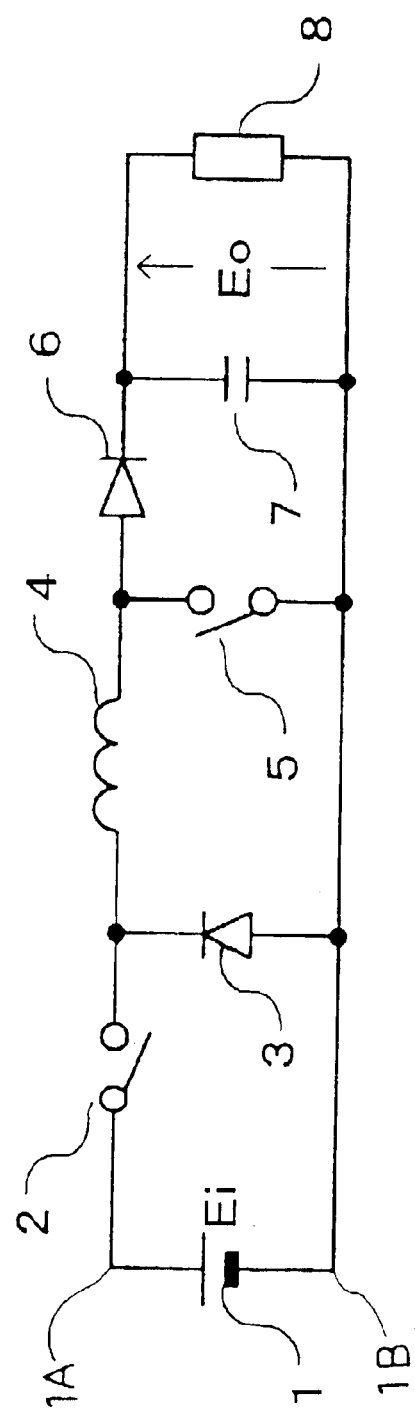
FIG. 13 is the basic circuit diagram of the conventional DC-to-DC converter.
Figure 14:
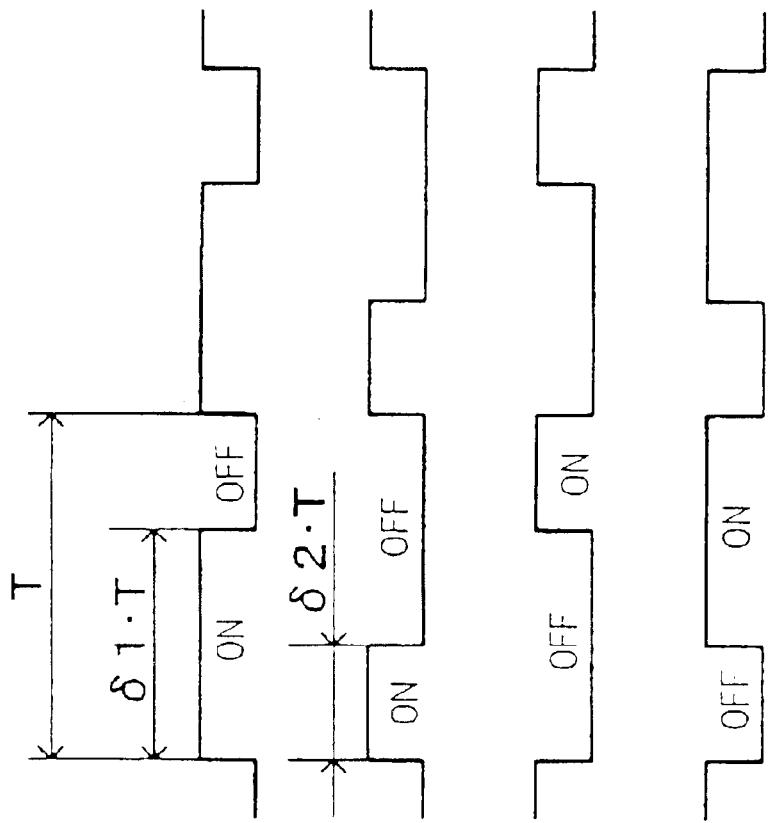
FIG. 14a to FIG. 14d are waveform diagrams showing the waveforms of signals at various parts of the DC-to-DC converter shown in FIG. 13.

The switch 2 and the switch 5 are turned ON and turned OFF by the control section 9 at the same switching period T. Since the operations of the switches 2 and 5 are the same as those of the switches 2 and 5 in the conventional DC-to-DC converter shown in FIG. 13, the operations will be described referring to FIG. 14. The ratio of the ON time period of the switch 2 to the switching period T is designated by $\delta 1$, which is a duty ratio in the switch 2. And the ratio of the ON time period of the switch 5 to the switching period T is designated by $\delta 2$, which is a duty ratio in the switch 5. The duty ratio $\delta 1$ is made larger than the duty ratio $\delta 2$ so that the switch 2 remains ON-state while the switch 5 is ON-state. For convenience in explanation, it is assumed that the diodes 3 and 6 have no forward voltage drops in the conductive states.

When both the switch 2 and the switch 5 are ON-state, the DC input voltage Ei of the DC input power source 1 is applied to the inductor 4. The time period of this voltage application is represented by $\delta 2 \cdot T$. In this state, current flows from the DC input power source 1 to the inductor 4, whereby magnetic energy is stored in the inductor 4. Subsequently, when the switch 5 turns OFF, the second diode 6 turns ON, and the voltage difference (Ei–Eo) between the DC input voltage Ei and the DC output voltage Eo is applied to the inductor 4. The time period of this voltage application is represented by $(\delta 1 - \delta 2) \cdot T$. During this time period, current flows from the DC input power source 1 to the output capacitor 7 via the inductor 4. Furthermore, when both the switches 2 and 5 turn OFF, the diode 3 turns ON, and the DC output voltage Eo is applied to the inductor 4 in the opposite direction. The time period of this voltage application is represented by $(1 - \delta 1) \cdot T$. During this time period, current flows from the inductor 4 to the output capacitor 7, whereby the stored magnetic energy is released.

By repeating actions of storage and release of the magnetic energy as described above, electric power is supplied from the output capacitor 7 to the load 8. In a stable operation state wherein the storage and release of the magnetic energy of the inductor 4 balance with each other, a "sum of the integrals of the voltages with respect to time" is zero, whereby Equation (1) is established, just as in the case of the conventional DC-to-DC converter. The relationship represented by Equation (2) is established between the DC input voltage Ei and the DC output voltage Eo, and it is referred to a conversion characteristic relation. When $\delta 2 = 0$, Equation (3) is established similarly, whereby the DC-to-DC converter operates as a voltage down-converter which outputs a DC voltage lower than the DC input voltage. Furthermore, when $\delta 1 = 1$ in Equation (2), Equation (4) is also established similarly, whereby the DC-to-DC converter operates as a voltage up-converter which outputs a DC voltage higher than the DC input voltage. By controlling the duty-ratios δ1 and δ2 of the switches 2 and 5, the value of δ1/(1−δ2) can be set at any given value in the range of zero to infinity. Hence, the DC-to-DC converter serves the voltage up-converter and the voltage down-converter capable of obtaining the DC output voltage Eo having any given value from the DC input voltage Ei having any given value.

FIG. 2a is a waveform diagram showing the waveforms of signals at the various parts in the control section 9, showing the sawtooth voltage Vt, the error voltage Ve and the output voltage (Ve+Vos) of the adder 120. FIG. 2b and FIG. 2c show the drive signal Vd1 and the drive signal Vd2, respectively. In a portion A of FIG. 2a, the sawtooth voltage Vt is higher than the error voltage Ve. In a portion B, the waveform of the sawtooth voltage Vt intersects the waveform of the error voltage Ve and the waveform of the output voltage (Ve+Vos). In a portion C, the sawtooth voltage Vt is lower than the output voltage (Ve+Vos).

When the detection voltage Ed2 rises and becomes higher than the reference voltage Er of the reference voltage source 100, the error voltage Ve output from the error amplification circuit 10 lowers, and vice versa. In other words, when the DC output voltage Eo rises owing to the rising of the DC input voltage Ei or the decrease of the load 8, the error voltage Ve lowers. On the other hand, when the DC output voltage Eo lowers owing to the lowering of the DC input voltage Ei or the increase of the load 8, the error voltage Ve rises.

First, in the case when the DC input voltage Ei is high and the error voltage Ve is lower than the sawtooth voltage Vt (as shown in the portion A of FIG. 2a), the drive signal Vd2 output from the comparator 122 is a logical L level (hereafter simply referred to as "L"), whereby the switch 5 keeps its OFF state. Hence, the duty ratio δ2 of the switch 5 is 0 (δ2=0). The switch 2 is turned ON and turned OFF by the drive signal Vd1 output from the comparator 121. The duty ratio δ1 is made smaller as the error voltage Ve lowers. In this case, the relationship between the DC input voltage Ei and the DC output voltage Eo of the DC-to-DC converter is represented by Equation (3), and the DC-to-DC converter operates as the voltage down-converter.

Next, in the case when the DC input voltage Ei is nearly equal to the DC output voltage Eo and when the waveform of the sawtooth voltage Vt intersects the waveform of the error voltage Ve and the waveform of the output voltage (Ve+Vos) of the adder 120 as shown in the portion B of FIG. 2a, the switch 2 is turned-ON and turned OFF by the first drive signal Vd1, and the switch 5 is turned ON and turned OFF by the second drive signal Vd2. The duty ratio δ1 and the duty ratio δ2 are made smaller as the error voltage Ve lowers. In this case, the relationship between the DC input voltage Ei and the DC output voltage Eo of the DC-to-DC converter is represented by Equation (2), and the DC-to-DC converter operates as the voltage up-converter and the voltage down-converter.

In the case when the DC input voltage Ei is low and the sawtooth voltage Vt is lower than the output voltage (Ve+Vos) as shown in the portion C of FIG. 2a, the drive signal Vd1 remains "H", whereby the switch 2 keeps its ON state. Hence, the duty ratio δ1 of the switch 2 is 1 (δ1=1). The switch 5 is turned ON and turned OFF by the drive signal Vd2, and the duty ratio δ2 thereof increases as the error voltage Ve rises. In this case, the relationship between the DC input voltage Ei and the DC output voltage Eo of the DC-to-DC converter is represented by Equation (4), and the DC-to-DC converter operates as the voltage up-converter.

The DC-to-DC converter in the present embodiment operates in the manner mentioned above in a steady state thereof. The above mentioned operation is similar to that of the conventional DC-to-DC converter shown in FIG. 13 to FIG. 16c. When the resistance values of the resistors 101, 102 and 103 are represented by R1101, R102 and R103, respectively, the detection voltage Ed2 inputted to the error amplifier 104 is represented by Equation (5).

$$Ed2 = \frac{R103}{R101 + R102 + R103} \cdot Eo \quad (5)$$

The DC output voltage Eo is controlled so that the detection voltage Ed2 becomes equal to the reference voltage Er. The control of the DC output voltage Eo is carried out by charging the duty ratios δ1 and δ2 of the switches 2 and 5, respectively. Consequently, the DC output voltage Eo is controlled so as to become equal to a desired value of the output setting voltage Eset represented by Equation (6).

$$Eset = \frac{R101 + R102 + R103}{R103} \cdot Er \quad (6)$$

By conducting a similar calculation, the first voltage E1 (<Eset) is represented by Equation (7). The first voltage E1 is the same as the DC output voltage Eo when the detection voltage Ed1 at the connection point of the resistors 101 and 102 becomes equal to the reference voltage Er.

$$E1 = \frac{R101 + R102 + R103}{R102 + R103} \cdot Er \quad (7)$$

When the resistance values of the resistors 131 and 132 are represented by R131 and R132, respectively, the second voltage E2 (<Ei) is represented by Equation (8). The second voltage E2 is the same as the DC output voltage Eo when the voltage Ec1 is equal to the detection voltage Ed1.

$$E2 = \frac{R132}{R131 + R132} \cdot \frac{R101 + R102 + R103}{R102 + R103} \cdot Ei \quad (8)$$

Figure 3A:
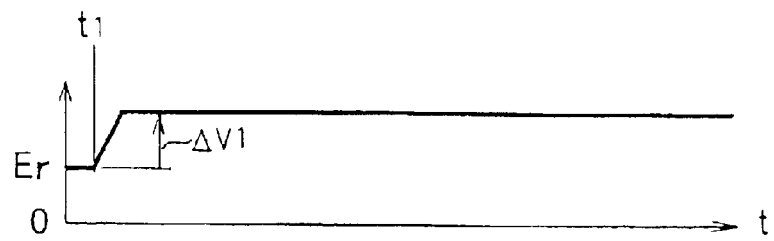
FIG. 3a to FIG. 3d are waveform diagrams showing the waveforms of signals at various parts of the DC-to-DC converter in accordance with the first embodiment of the present invention in the case when the reference voltage Er rises.
Figure 3B:
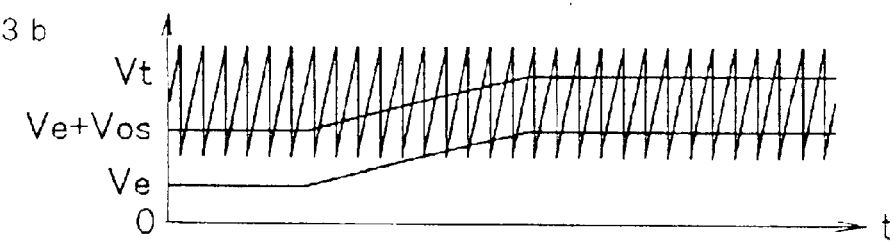
Figure 3C:
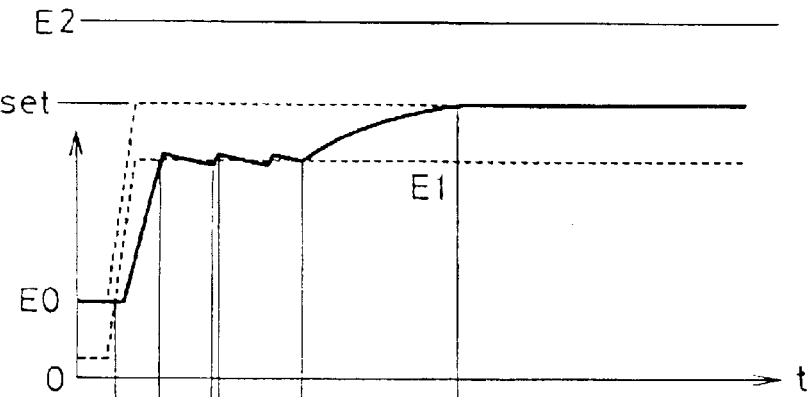
Figure 3D:
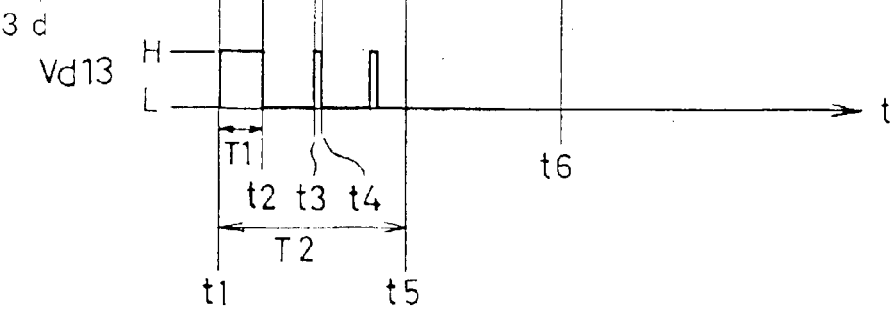

Next, the operation in the case when the reference voltage Er is changed by a control signal supplied from the load 8 will be described below referring to FIG. 3a to FIG. 3d. FIG. 3a, FIG. 3b, FIG. 3c and FIG. 3d show the waveforms of signals at various parts of the DC-to-DC converter when the DC-to-DC converter in this embodiment operates as the voltage down-converter. When the reference voltage Er rises by a voltage ΔV1 as shown in FIG. 3a, the DC-to-DC converter operates as described below. FIG. 3b is a waveform diagram showing the relationship among the waveforms of the sawtooth voltage Vt, the error voltage Ve and the output voltage (Ve+Vos). FIG. 3c is a waveform diagram showing the waveforms of the DC output voltage Eo, the output setting voltage Eset, the first voltage E1 and the second voltage E2. FIG. 3d is a waveform diagram showing the waveform of the drive signal Vd13 for the switch 135.

It is assumed that the reference voltage Er rises by the voltage ΔV1 at time t1 by the control of the load 8 as shown in FIG. 3a. It is also assumed that the first voltage E1 after the rising of the reference voltage, Er is lower than the second voltage E2. As the reference voltage Er rises, both the output setting voltage Eset and the first voltage E1 rise corresponding to the reference voltage Er. Since the response speed of the error amplifier 104 is low, the error voltage Ve and the output voltage (Ve+Vos) rise gradually as shown in FIG. 3b. The output of the comparator 130 is "L", since the detection voltage Ed1 at the noninverting input terminal thereof is lower than the reference voltage Er. The output of the comparator 133 is "L", because the DC output voltage Eo is lower than the second voltage E2. Hence, the NOR circuit 134 outputs "H" for the drive signal Vd13 of the charging switch 135, and the charging switch 135 turns ON. In the ON-state of the charging switch 135, a current flows from the DC input power source 1 to the output capacitor 7 via the resistor 136 so as to quickly charge the output capacitor 7. The ON-state of the charging switch 135 continues until time t2, at which the DC output voltage Eo reaches the first voltage E1 and the output of the comparator 130 is inverted. When the error voltage Ve has not risen so as to reach a predetermined value, the DC output voltage Eo lowers gradually in the time period between time t2 and time t3. At time t3, the charging switch 135 turns ON again. As a result, the DC output voltage Eo rises, and the charging switch 135 turns OFF at time t4. In this way, the charging switch 135 turns ON and turns OFF alternately. Then, the error voltage Ve rises sufficiently, and the DC output voltage Eo does not become lower than the first voltage E1 even when the charging switch 135 is OFF. Consequently, the DC output voltage Eo reaches the output setting voltage Eset, and a steady operation state is attained. As described above, in the DC-to-DC converter in accordance with this embodiment, when the output setting voltage Eset is changed to set at a higher value, the DC output voltage Eo rises quickly in the time period T1 from time t1 to time t2, and reaches the first voltage E1 approximately equal to the output setting voltage Eset. On the other hand, in the case of the-conventional DC-to-DC converter shown in FIG. 15, the DC output voltage Eo reaches the first voltage E1 in the time period T2 from time t1 to time t5. As described above, the response speed of the DC-to-DC converter in accordance with this embodiment is far higher than that of the conventional DC-to-DC converter.

Figure 4A:
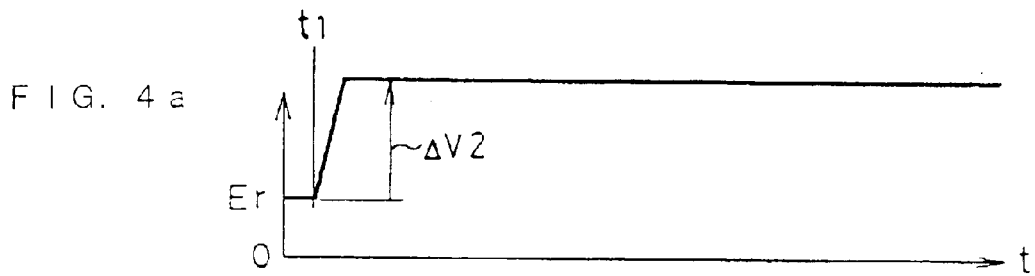
FIG. 4a to FIG. 4d are waveform diagrams showing the waveforms of signals at various parts of the DC-to-DC converter in accordance with the first embodiment of the present invention in the case when the reference voltage Er rises significantly.
Figure 4B:
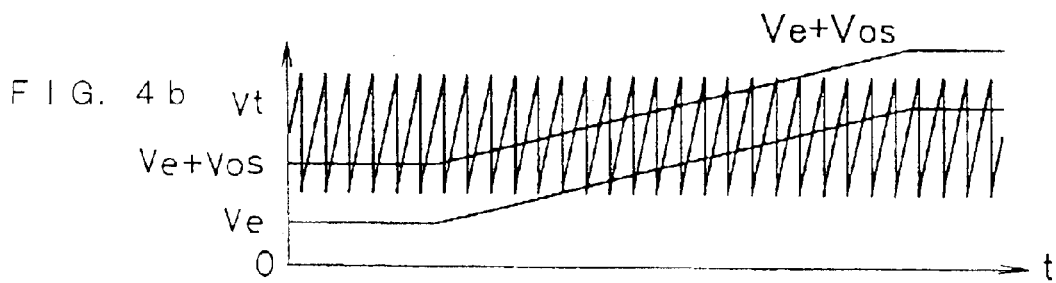
Figure 4C:
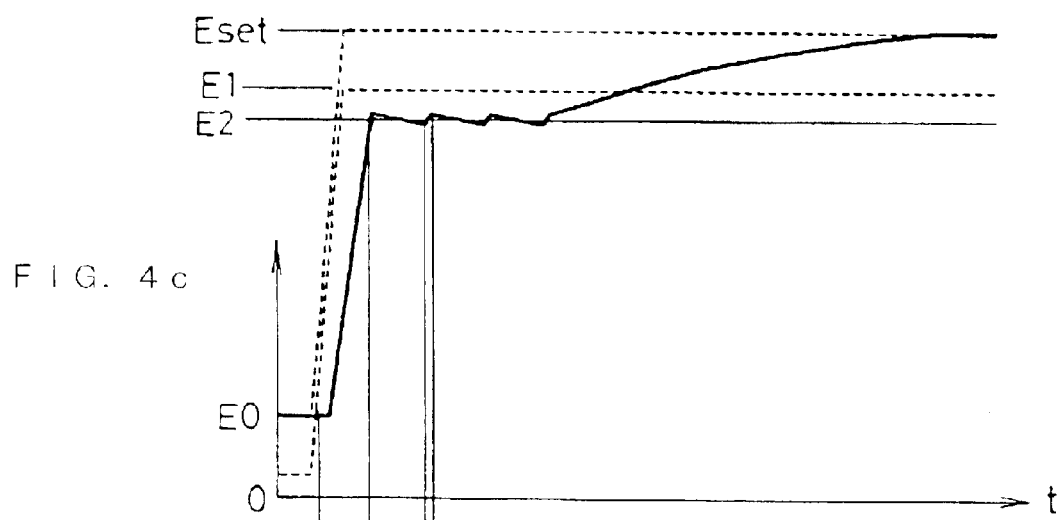
Figure 4D:
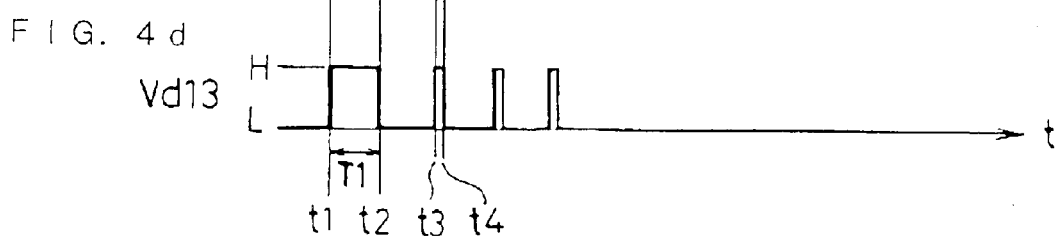

FIG. 4a, FIG. 4b, FIG. 4c and FIG. 4d show the waveforms of signals at various parts of the DC-to-DC converter in accordance with this embodiment in the case when the reference voltage Er significantly rises by a voltage ΔV2 higher than the above-mentioned voltage ΔV1 at time t1. Immediately after the reference voltage Er has risen, the first voltage E1 becomes higher than the second voltage E2. As the reference voltage Er rises significantly, both the output setting voltage Eset and the first voltage E1 also rise significantly. Since the response speed of the error amplifier 104 is low, the error voltage Ve and the output voltage (Ve+Vos) rise gradually as shown in FIG. 4b. The output of the comparator 130 is "L" at time t1, since the detection voltage Ed1 at the noninverting input terminal thereof is lower than the reference voltage Er. The output of the comparator 133 is "L" at time t1, because the DC output voltage Eo is lower than the second voltage E2. Hence, the NOR circuit 134 outputs "H" for the drive signal Vd13 of the charging switch 135, and the charging switch 135 turns ON. Consequently, a charging current flows quickly from the DC input power source 1 to the output capacitor 7. The ON-state of the charging switch 135 continues until the DC output voltage Eo reaches the second voltage E2 at time t2 and the output of the comparator 130 is inverted. When the error voltage Ve has not risen sufficiently at time t2 but is lower than the sawtooth voltage Vt, the DC output voltage Eo lowers gradually. When the DC output voltage Eo becomes lower than the second voltage E2 at time t3, the charging switch 135 turns ON again. Hence, the DC output voltage Eo rises again, and the charging switch 135 turns OFF at time t4. In this way, the charging switch 135 turns ON and turns OFF alternately. In due time, the error voltage Ve rises, and the DC output voltage Eo does not become lower than the second voltage E2 even when the charging switch 135 is in the OFF-state. Consequently, the DC output voltage Eo reaches the first voltage E1 and results in coincidence with the output setting voltage Eset.

The first voltage E1 is preferably selected to a value identical to or higher than an allowable lower limit of the DC output voltage Eo and a value close to the output setting voltage Eset. In addition, the second voltage E2 is preferably selected to a value obtained by subtracting voltage drops at the charging switch 135 and the resistor 136 from the DC input voltage Ei.

In the DC-to-DC converter in accordance with the first embodiment, when the reference voltage Er of the error amplifier 104 is raised in order to raise the output setting voltage Eset, the charging switch 135 turns ON in a time period far shorter than the response time of the error amplifier 104. When the charging switch 135 turns on, a current flows from the DC input power source 1 to the output terminal 50 via the resistor 136, whereby the output capacitor 7 is charged. Consequently, the voltage at the output terminal 50 rises quickly to a value close to the DC input voltage Ei. On the other hand, in the case of the conventional DC-to-DC converter shown in FIG. 15, the error voltage Ve changes gradually owing to the relatively low response speed of the error amplifier 104, whereby the DC output voltage Eo also changes gradually. Therefore, the conventional DC-to-DC converter was not applicable to uses in which the DC output voltage Eo is desired to be changed quickly. In the DC-to-DC converter in accordance with this embodiment, since the DC output voltage Eo quickly rises by quickly charging the output capacitor 7 through the charging switch 135, the response time of the DC-to-DC converter can be reduced significantly. The charging switch 135 remains ON until the DC output voltage Eo reaches a lower one of the first voltage E1 and the second voltage E2. The first voltage E1 is lower than the output setting voltage Eset by a predetermined voltage, and the second voltage E2 lower than the DC input voltage Ei by a predetermined voltage. After then, the charging switch 135 turns OFF. Therefore, overshoot is not liable to occur in the DC output voltage Eo.

The resistor 136 serves to limit the charging current flowing through the charging switch 135 from the DC input power source 1 to the output capacitor 7 while the output capacitor 7 is charged. In the case that the charging switch 135 has a high impedance in the ON-state, it is not necessary to connect the resistor 136 in series with the charging switch 135.

<<Second Embodiment>>

Figure 5:
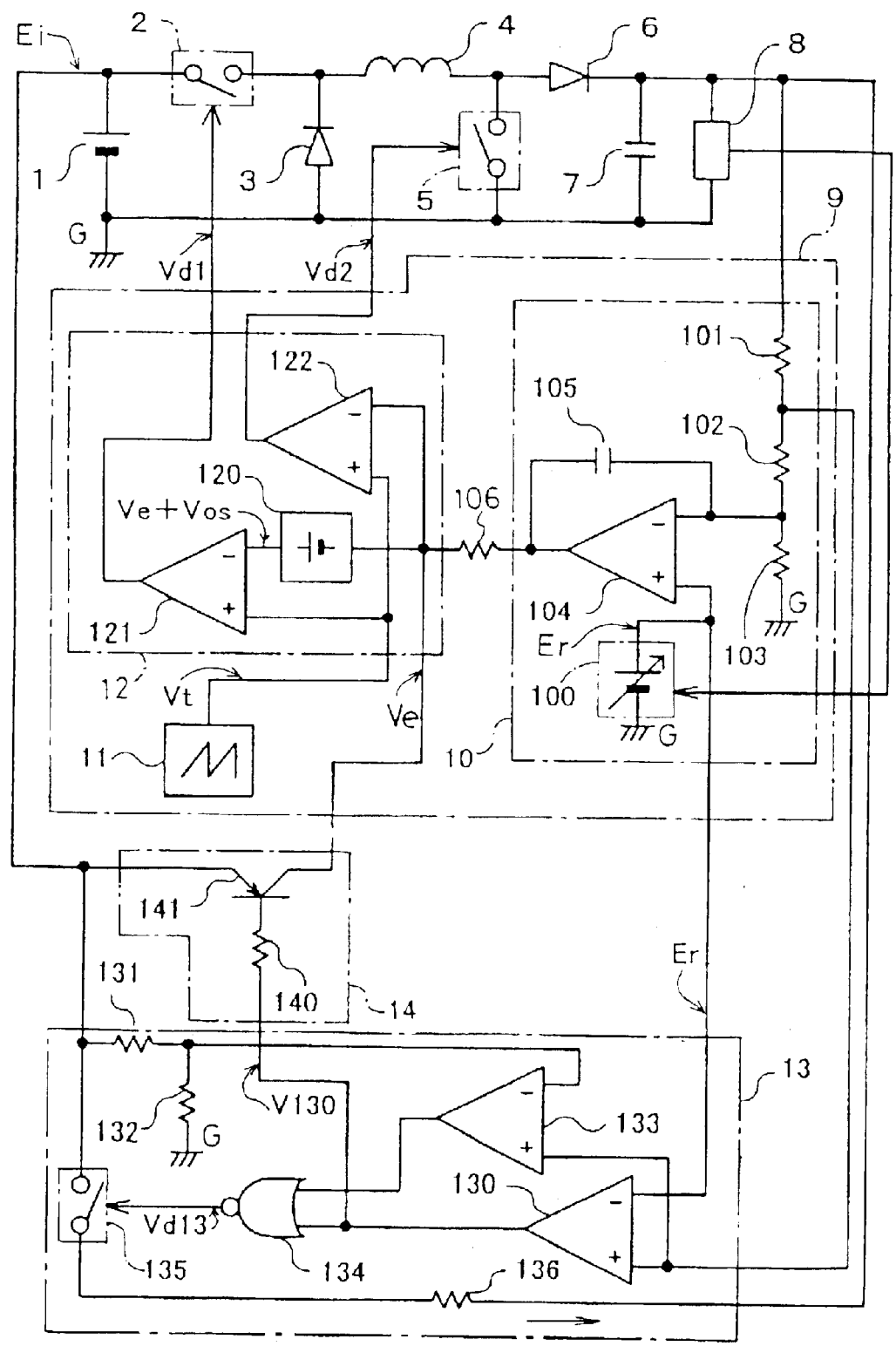
FIG. 5 is a circuit diagram of a DC-to-DC converter in accordance with a second embodiment of the present invention.

FIG. 5 is a circuit diagram of a DC-to-DC converter in accordance with a second embodiment of the present invention. The DC-to-DC converter in accordance with the second embodiment is attained by adding an auxiliary response speedup circuit 14 comprising a resistor 140 and a PNP transistor 141 to the DC-to-DC converter in accordance with the first embodiment shown in FIG. 1. In addition, the error voltage Ve output from the error amplifier 104 is supplied to the pulse-width control circuit 12 via a resistor 106. In FIG. 5, components similar to those of the DC-to-DC converter in the first embodiment shown in FIG. 1 are designated by the same numerals, and their explanations are omitted to prevent overlaps.

The output of the comparator 130 is input to the base of the PNP transistor 141 of the auxiliary response speedup circuit 14 via the resistor 140 as a drive signal V130. The collector of the PNP transistor 141 is connected to the inverting input terminal of the comparator 122, and the emitter thereof is connected to the positive pole 1A of the DC input power source 1. When the drive signal V130 is applied to the base of the PNP transistor 141 via the resistor 140, the PNP transistor 141 turns ON, whereby the level of the error voltage Ve is raised.

In the DC-to-DC converter of the second embodiment, the operation at the time when the first voltage E1 becomes higher than the second voltage E2 owing to the rising of the reference voltage Er will be described below referring to FIG. 6a to FIG. 6e.

Figure 6A:
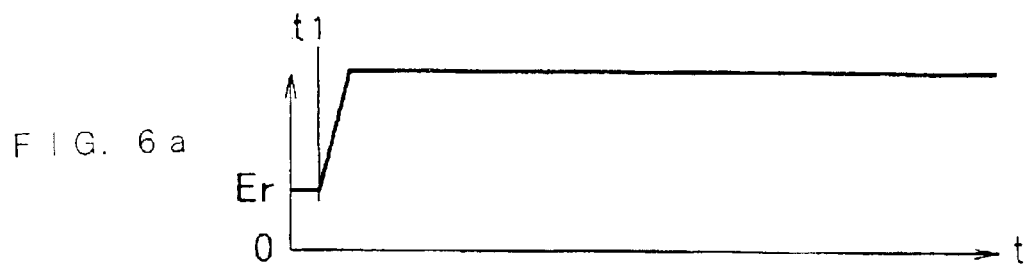
FIG. 6a to FIG. 6e are waveform diagrams showing the waveforms of signals at various parts of the DC-to-DC converter in accordance with the second embodiment of the present invention.
Figure 6B:
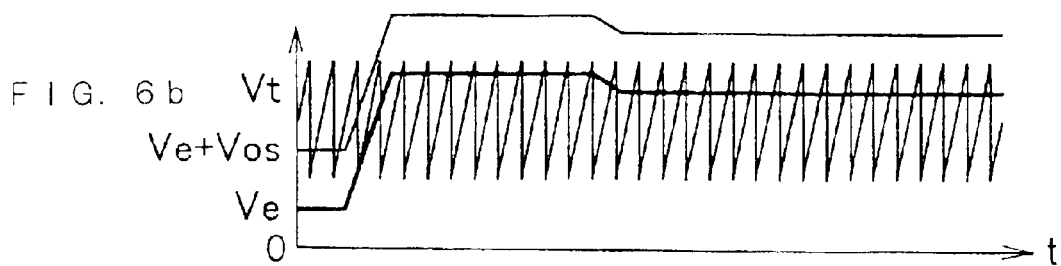
Figure 6C:
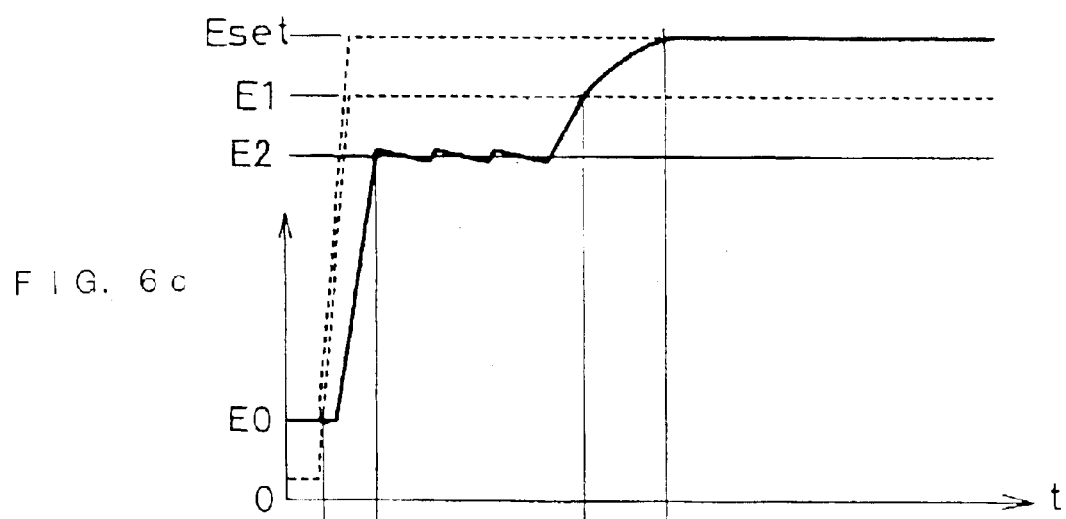
Figure 6D:
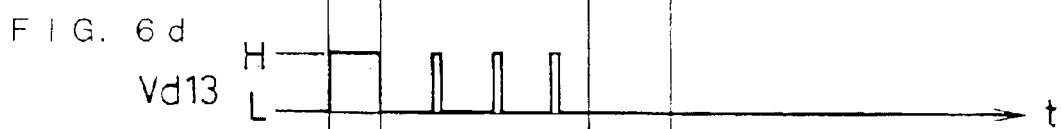
Figure 6E:
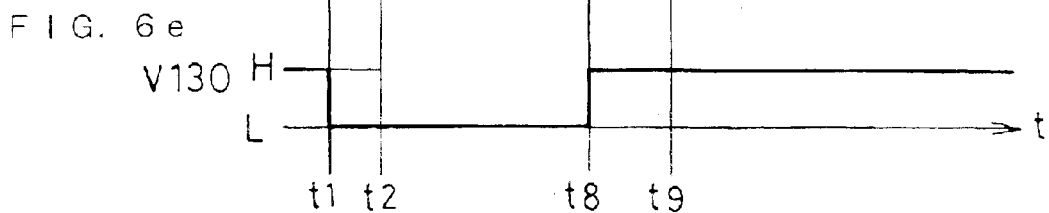

FIG. 6a, FIG. 6b, FIG. 6c, FIG. 6d and FIG. 6e show the waveforms of signals at various parts of the DC-to-DC converter in the second embodiment. FIG. 6a shows the change of the reference voltage Er. FIG. 6b is a waveform diagram showing the waveforms of the sawtooth voltage Vt, the error voltage Ve and the output voltage (Ve+Vos). FIG. 6c is a waveform diagram showing the waveforms of the DC output voltage Eo, the output setting voltage Eset, the first voltage E1 and the second voltage E2. FIG. 6d is a waveform diagram showing the waveform of the drive signal Vd13 of the charging switch 135. FIG. 6e is a waveform diagram showing the waveform of the drive signal V130 of the auxiliary response speedup circuit 14.

When the reference voltage Er is raised at time t1 as shown in FIG. 6a in order to set the output setting voltage Eset at a higher setting value, the first voltage E1 also rises as the reference voltage Er is raised. Hence, the error voltage Ve output from the error amplifier 104 and the output voltage (Ve+Vos) having a low response speed rise gradually as shown in FIG. 3b of the first embodiment. As described in the explanation of the above-mentioned first embodiment, the comparator 130 outputs the drive signal V130 being "L" at time t1 (FIG. 6e). The drive signal V130 being "L" is applied to the base of the PNP transistor 141, whereby the PNP transistor 141 turns ON. As a result, the DC input voltage Ei is applied to the inverting input terminal of the comparator 122 via the PNP transistor 141. Hence, the error voltage Ve is pulled up to the DC input voltage Ei, thereby rising quickly (FIG. 6b). The charging switch 135 turns ON at time t1 (FIG. 6d), whereby the output capacitor 7 is charged quickly by the DC input power source 1, just as in the case of the above-mentioned first embodiment. The ON state of the charging switch 135 continues until the DC output voltage Eo reaches the second voltage E2 and the output of the comparator 133 is inverted to "H" at time t2. In this time period, the PNP transistor 141 is ON, whereby the error voltage Ve having been pulled up to the DC input voltage Ei rises quickly. Hence, the first switch 2 keeps its ON state, and the second switch 5 turns ON/OFF at its maximum duty ratio. As a result, the DC-to-DC converter carries out voltage step-up operation (FIG. 6c). The voltage step-up operation wherein the switch 5 turns ON and turns OFF at the maximum duty ratio continues until the DC output voltage Eo reaches the first voltage E1 at time t8, the drive signal V130 output from the comparator 130 is inverted to "H", and the PNP transistor 141 turns OFF. After time t8, a normal control state is attained, wherein the DC output voltage Eo rises toward the output setting voltage Eset. At time t9, the DC output voltage Eo settles at the output setting voltage Eset. The resistor 106 limits the charging current flowing to the phase compensating capacitor 105 when the error voltage Ve is pulled up to the DC input voltage Ei by the PNP transistor 141, thereby, preventing the detection voltages Ed1 and Ed2 from changing significantly.

As described above, in the DC-to-DC converter in the second embodiment, during the voltage step-up operation wherein the output setting voltage Eset is higher than the DC input voltage Ei, voltage step-up is continued by operating the switch 5 at the maximum duty ratio until the DC output voltage Eo reaches the first voltage E1 after the turning OFF of the charging switch 135. As a result, the response time of the DC-to-DC converter during the step-up operation can be reduced significantly.

<<Third Embodiment>>

Figure 7:
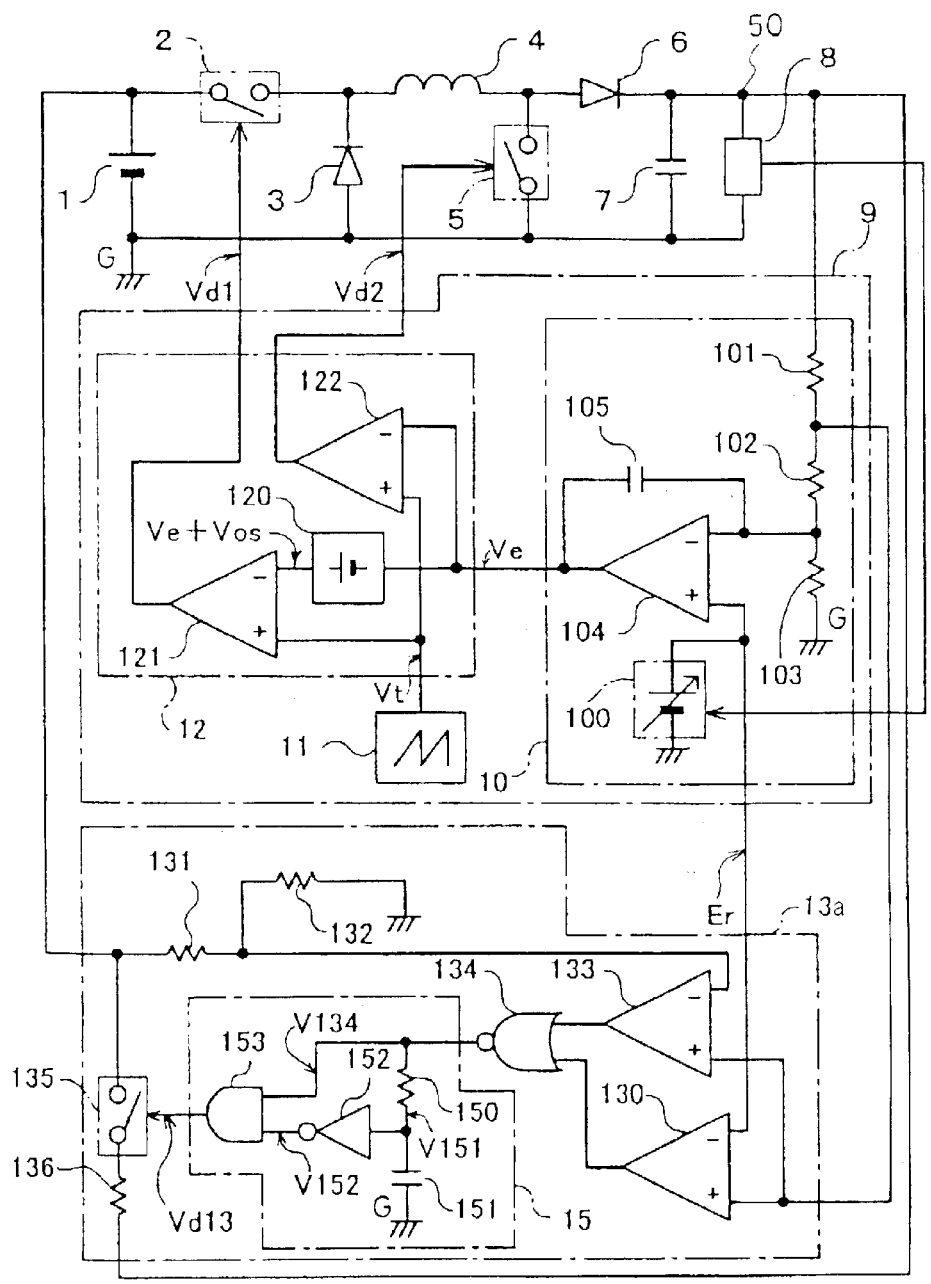
FIG. 7 is a circuit diagram of a DC-to-DC converter-in accordance with a third embodiment of the present invention.
Figure 8:
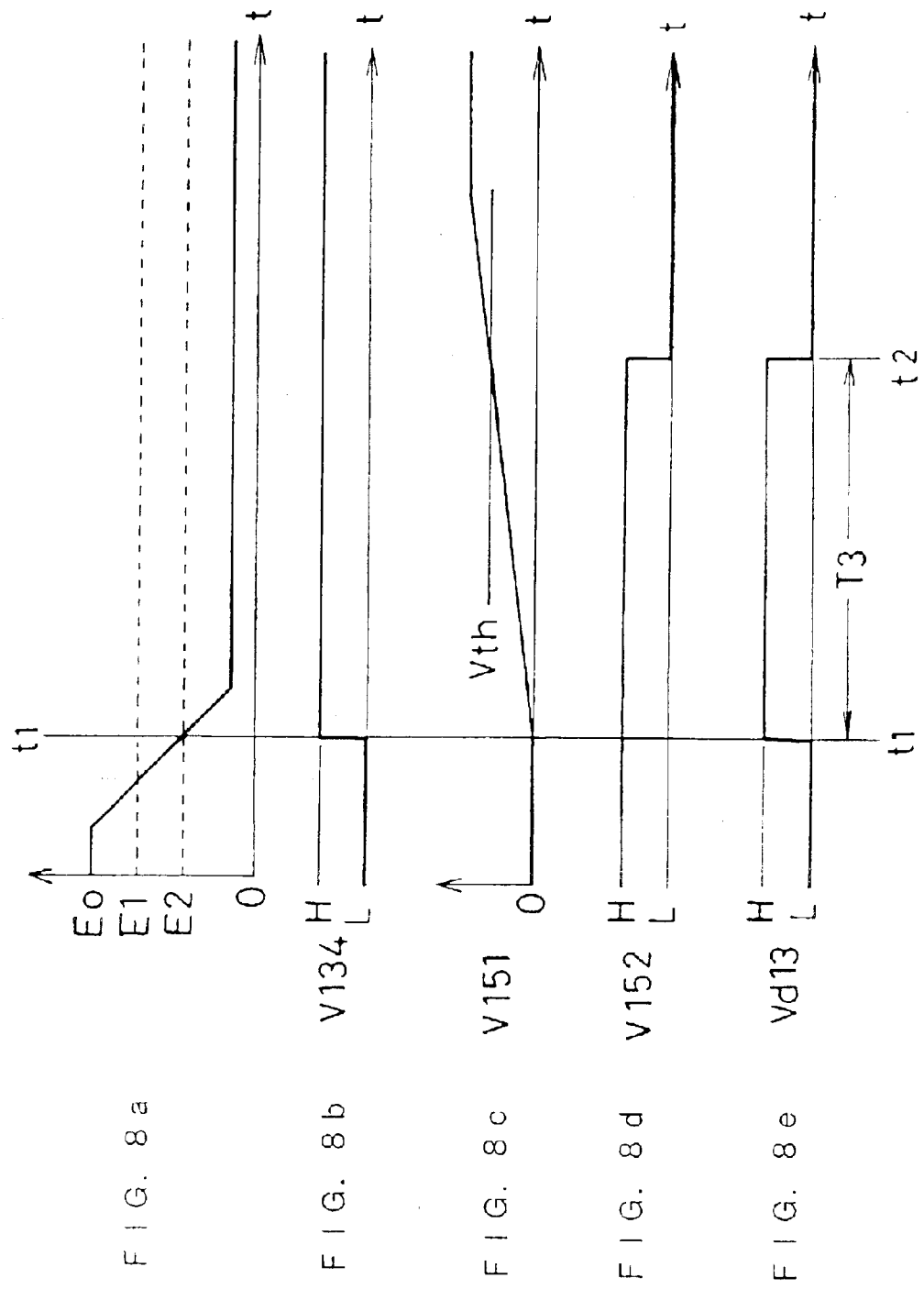
FIG. 8a to FIG. 8e are waveform diagrams showing the waveforms of signals at various parts of the DC-to-DC converter in accordance with the third embodiment of the present invention.

FIG. 7 is a circuit diagram of a DC-to-DC converter in accordance with a third embodiment of the present invention. Referring to FIG. 7, the DC-to-DC converter in this embodiment comprises a maximum ON time period setting circuit 15 connected to the output terminal of the NOR circuit 134 in a response speedup circuit 13a of the DC-to-DC converter. Since the other components are substantially identical to those of the DC-to-DC converter in the first embodiment, the same components are designated by the same numerals, and their descriptions are omitted to prevent overlaps.

The output terminal of the NOR circuit 134 is connected to one of the input terminals of the AND circuit 153 of the maximum ON time period setting circuit 15. In addition, the output terminal of the NOR circuit 134 is also connected to the other input terminal of the AND circuit 153 via a resistor 150 and an inverter 152 being connected in series. A capacitor 151 is connected between the connection point of the resistor 150 and the inverter 152 and the circuit ground G. The output of the AND circuit 153 is applied to the charging circuit 135. The NOR circuit 134 and the first maximum ON time period setting circuit 15 constitute a first drive circuit. The output V134 of the NOR circuit 134 is delayed by a delay circuit comprising the resistor 150, the capacitor 151 and the inverter 152, and the output of the delay circuit is output as a delay voltage V152. The output V134 of the NOR circuit 134 and the delay voltage V152 are inputted to the AND circuit 153 which outputs a delayed drive signal Vd13 to the charging switch 135.

The DC-to-DC converter in the third embodiment differs from the DC-to-DC converter in the first embodiment in that the DC-to-DC converter in accordance with the third embodiment has a protection function capable of coping with the case when the DC output voltage Eo lowers significantly owing to a short circuit at the load 8 or activation of an overload protection circuit not shown. In the DC-to-DC converter in the first embodiment, if the DC output voltage Eo becomes lower than the first voltage E1 and the second voltage E2 because of the above-mentioned abnormality, the charging switch 135 is remained in the ON-state. Hence, the loss in the charging switch 135 increases, and the charging switch 135 is liable to result in breakage. Therefore, a protection function for preventing the charging switch 135 from breaking is necessary. Accordingly, this embodiment relates to a protection circuit for the charging switch 135.

The operation of the DC-to-DC converter in the third embodiment shown in FIG. 7 will be described below referring to FIG. 8a to FIG. 8e. FIG. 8a to FIG. 8e are waveform diagrams showing the waveforms of signals at various parts of the DC-to-DC converter in this embodiment in the case when the DC output voltage Eo lowers owing to an abnormality. FIG. 8a shows the relationship among the DC output voltage Eo, the first voltage E1 and the second voltage E2. FIG. 8b shows the output V134 of the NOR circuit 134. FIG. 8c shows the voltage V151 of the capacitor 151, FIG. 8d shows the delay voltage V152 output from the inverter 152, and FIG. 8e shows the drive signal Vd13 supplied to the charging switch 135.

Referring to FIG. 8a, if the DC output voltage Eo lowers significantly and becomes lower than the first voltage E1 and the second voltage E2 at time t1, both the outputs of the comparator 130 and the comparator 133 become "L", and the output V134 of the NOR circuit 134 become "H". At time t1, the capacitor 151 begins to charge the output V134 via the resistor 150. Because the V151 is low, the delay voltage V152 output from the inverter 152 is "H". As a result, the output V134 being "H" and the delay voltage V152 being "H" are inputted to the AND circuit 153, and the drive signal Vd13 becomes "H", whereby the charging switch 135 turns ON. As the charging of the capacitor 151 advances and when the voltage V151 rises as shown in FIG. 8c and reaches the threshold value Vth of the inverter 152 at time t2, the delay voltage V152 is inverted to "L". Hence, the drive signal Vd13 output from the AND circuit 153 becomes "L," and the charging switch 135 turns OFF. The time period T3 from time t1 to time t2, that is, from turn-ON to turn-OFF of the charging switch 135, is set to a time period longer than the ON time period T1 of the charging switch 135 in the first embodiment.

In the third embodiment, the time period during which the drive signal Vd13 becomes "H," that is, the ON time period of the charging switch 135, is limited to the setting time period T3 by the maximum ON time period setting circuit 15. The charging switch 135 has been designed so as not to break during this setting time period even if it turns ON in the short circuited state of the load 8.

In the DC-to-DC converter in accordance with the third embodiment, by providing the maximum limit for the ON time period of the charging switch 135 as described above, the charging switch 135 is protected so as not to break even if the charging switch 135 turns ON when the load is short circuited.

<<Fourth Embodiment>>

Figure 9:
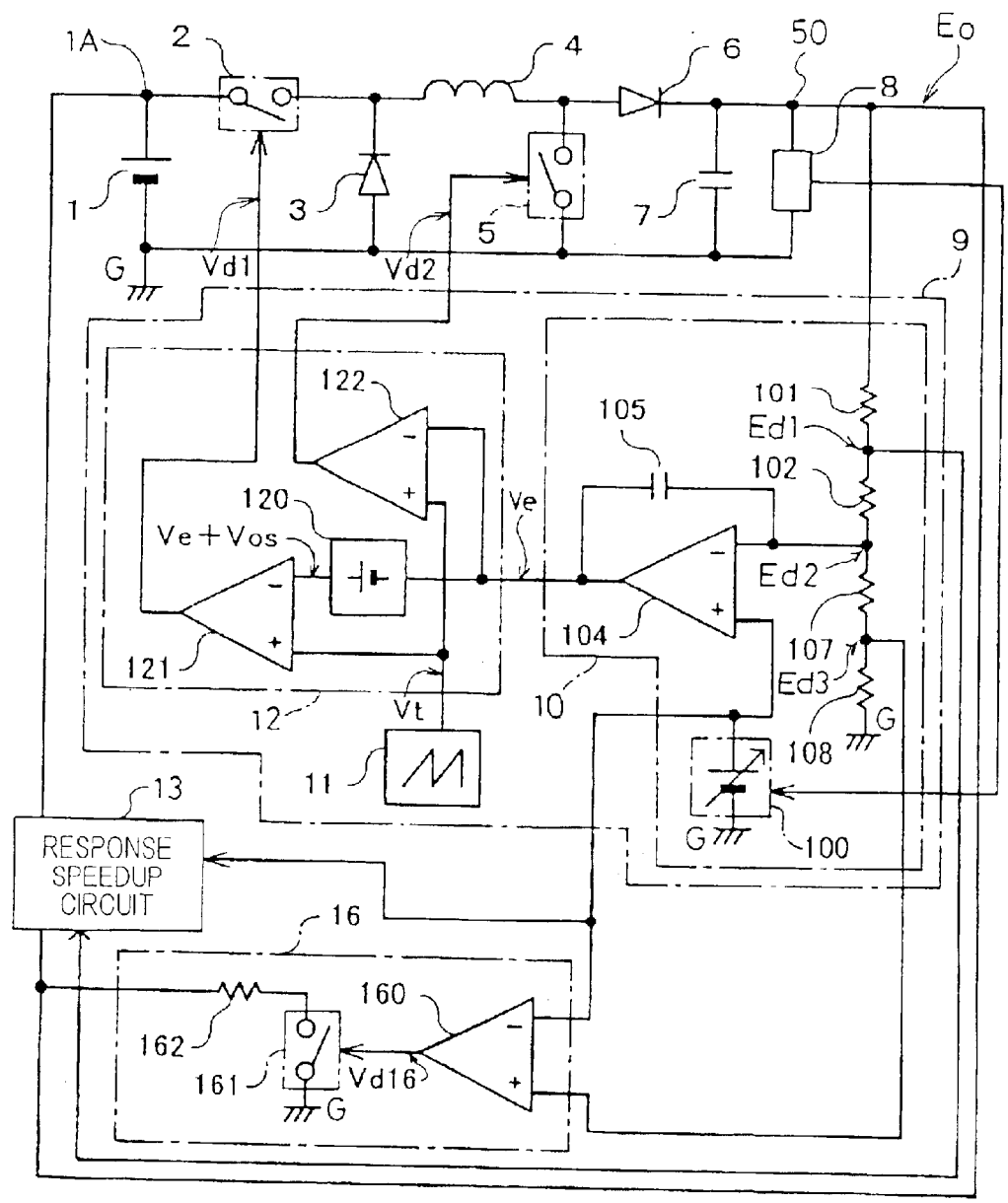
FIG. 9 is a circuit diagram of a DC-to-DC converter in accordance with a fourth embodiment of the present invention.

FIG. 9 is a circuit diagram of a DC-to-DC converter in accordance with a fourth embodiment of the present invention. In the DC-to-DC converter in accordance with this embodiment, the DC output voltage Eo can be significantly lowered at a high speed. The configuration of the DC-to-DC converter in the fourth embodiment differs from that of the DC-to-DC converter in the first embodiment shown in FIG. 1 in the following points. A resistor 107 having a resistance value of R107 and a resistor 108 having a resistance value of R108 are connected in series between the inverting input terminal of the error amplifier 104 of the error amplification circuit 10 and the circuit ground G. In addition to the response speedup circuit 13 shown in FIG. 1, another response speedup circuit 16 having a simpler configuration is provided. The response speedup circuit 13 is connected between the positive pole 1A of the DC input power source 1 and the output terminal 50. The response speedup circuit 13 is controlled by the reference voltage Er and the detection voltage Ed1 at the connection point of the resistors 101 and 102.

The added response speedup circuit 16 has a comparator 160 which accepts a detection voltage Ed3 on the connection point of the resistors 107 and 108 at the noninverting input terminal and accepts the reference voltage Er at the inverting input terminal. The response speedup circuit 16 also has a discharging switch 161 that turns ON and turns OFF depending on a drive signal Vd16 output from the comparator 160. One terminal of the discharging switch 161 is connected to the output terminal 50 via a resistor 162, and the other terminal is connected to the circuit ground G. The comparator 160 corresponds to a third comparison circuit. A third voltage E3 (>Eset), that is, the DC output voltage Eo in the case when the detection voltage Ed3 becomes equal to the reference voltage Er, is represented by Equation (9).

$$E3 = \frac{R101 + R102 + R107 + R108}{R108} \cdot Er \qquad (9)$$

The circuit formed of the resistors 101, 102, 107 and 108 for dividing the DC output voltage Eo corresponds to an output detection circuit. The first detection voltage at the connection point of the resistors 101 and 102 is referred to as a detection voltage Ed1, and the second detection voltage at the connection point of the resistors 102 and 107 is referred to as a detection voltage Ed2. Furthermore, the third detection voltage at the connection point of the resistors 107 and 108 is referred to as the detection voltage Ed3.

Figure 10A:
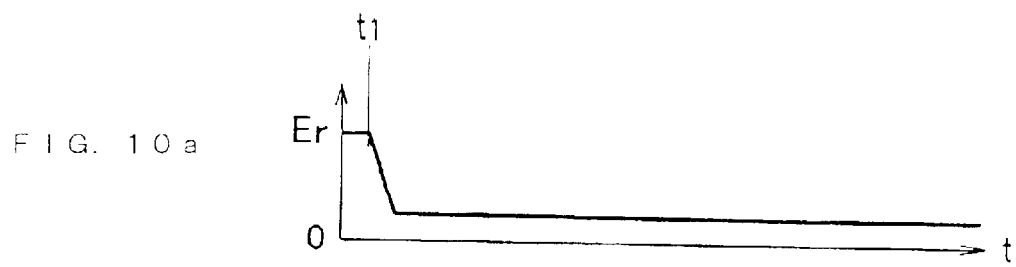
FIG. 10a to FIG. 10d are waveform diagrams showing the waveforms of signals at various parts of the DC-to-DC converter in accordance with the fourth embodiment of the present invention.
Figure 10B:
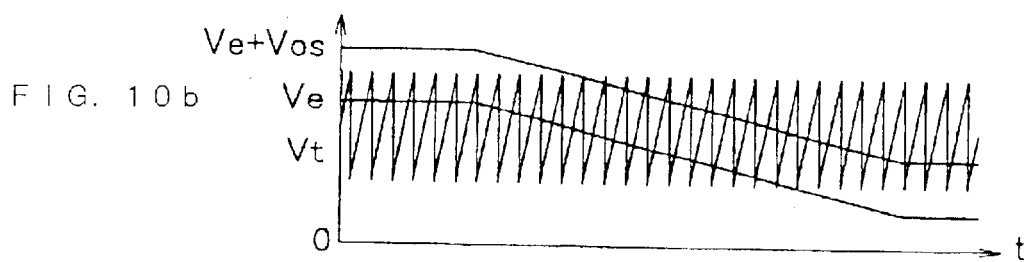
Figure 10C:
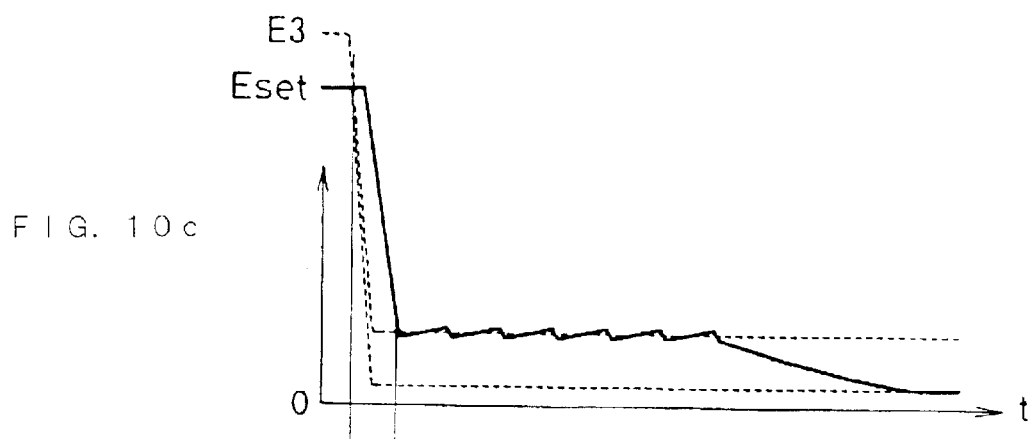
Figure 10D:
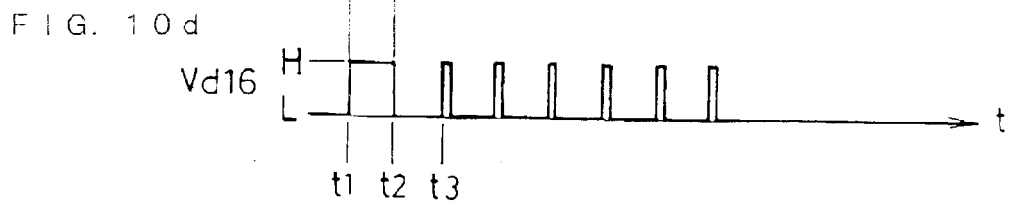

FIG. 10a to FIG. 10d show the waveforms of signals at various parts of the DC-to-DC converter in accordance with this embodiment. FIG. 10a is a waveform diagram showing the change of the reference voltage Er. FIG. 10b is a waveform diagram showing the waveforms of the error voltage Ve, the sawtooth voltage Vt and the output voltage (Ve+Vos). FIG. 10c is a waveform diagram showing the changes of the third voltage E3 and the output setting voltage Eset. FIG. 10d is a waveform diagram showing the waveform of the drive signal Vd16. When the output setting voltage Eset is changed to a lower value, the reference voltage Er is lowered by a command from the load 8 at time t1 as shown in FIG. 10a in order to lower the DC output voltage Eo. As the reference voltage Er lowers, the output setting voltage Eset and the third voltage E3 also lower as shown in FIG. 10c. However, since the response speed of the error amplifier 104 is low, the error voltage Ve and the output voltage (Ve+Vos) lower gradually as shown in FIG. 10b. In the comparator 160, the detection voltage Ed3 at the non-inverting input terminal thereof is higher than the reference voltage Er. Hence, the drive signal Vd16 output from the comparator 160 becomes "H." As a result, the discharging switch 161 turns ON, whereby the output terminal 50 is connected to the circuit ground G. Consequently, the charge of the output capacitor 7 is discharged quickly to the circuit ground G via the resistor 162. The ON state of the discharging switch 161 continues until the DC output voltage Eo reaches the third voltage E3 and the output of the comparator 160 is inverted to "L" at time t2. If the error voltage Ve has not lowered sufficiently, the DC output voltage Eo begins to rise. At time t3, the discharging switch 161 becomes ON again. When the DC output voltage Eo reaches the third voltage E3, the discharging switch 161 turns OFF. The turn-ON and turn-OFF operation is alternated until the DC output voltage Eo reaches the output setting voltage Eset. In this way, the error voltage Ve lowers. When the DC output voltage Eo finally reaches the output setting voltage Eset, a normal control state is attained.

It is preferable that the third voltage E3 is set at a value close to the output setting voltage Eset but not more than the allowable upper limit value of the DC output voltage Eo.

As described above, in the DC-to-DC converter of the fourth embodiment, when the DC output voltage Eo is made low, the output capacitor 7 is discharged quickly by turning ON the discharging switch 161. Consequently, the response time of the DC-to-DC converter is significantly reduced. The discharging switch 161 keeps its ON-state until the DC output voltage Eo reaches the third voltage E3 that is higher than the output setting voltage Eset by a predetermined voltage, after then, the discharging switch 161 turns OFF. Therefore, undershoot does not occur in the DC output voltage Eo.

The resistor 162 is used to limit the discharging current flowing from the output capacitor 7 when the discharging switch 161 is in the ON-state. In the case that the discharging switch 161 itself has an impedance when it is in the ON-state, the impedance may be utilized instead of the resistor 162.

<<Fifth Embodiment>>

In the DC-to-DC converter in accordance with the fourth embodiment described above, if the duty ratios of the switches 2 and 5 increase abnormally owing to malfunction of the control section 9, for example, the DC output voltage Eo may has an abnormally high value exceeding the output setting voltage Eset. In this case, the response speedup circuit 16 activates to turn ON the discharging switch 161, whereby the output terminal 50 is connected to the circuit ground G via the resistor 162. If the above-mentioned malfunction occurs, a problem described below arises. Since the rising of the DC output voltage Eo is caused by the abnormal operation of the control section 9, the DC output voltage Eo does not lower even when the discharging switch 161 turns ON. As a result, the discharging switch 161 keeps its ON state while allowing a large current to flow, whereby the discharging switch 161 may be in danger of damage.

A DC-to-DC converter in accordance with a fifth embodiment is characterized in that it has a section for protecting the discharging switch 161 even when the DC output voltage Eo rises abnormally owing to the malfunction of the control section 9 as described above.

Figure 11:
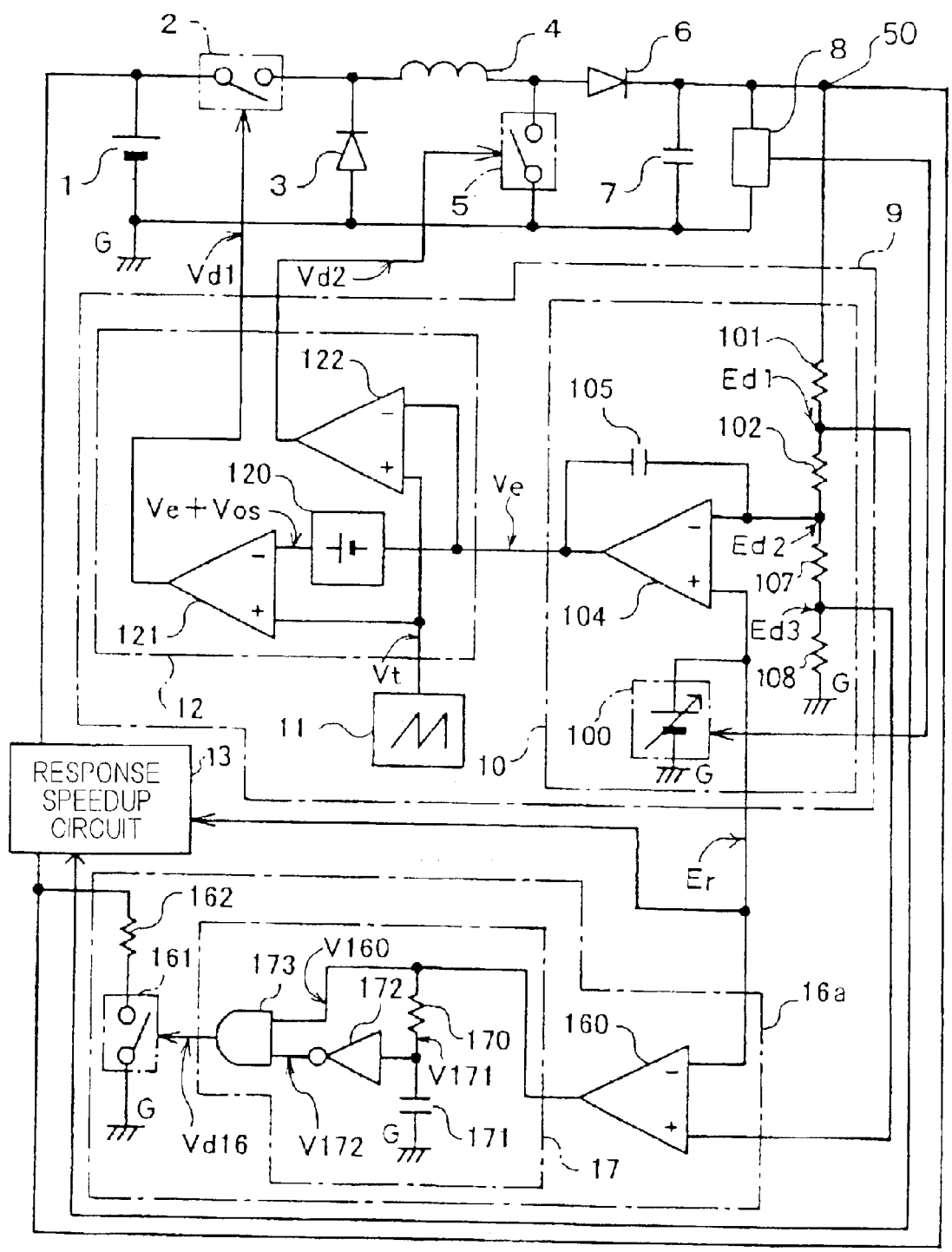
FIG. 11 is a circuit diagram of a DC-to-DC converter in accordance with a fifth embodiment of the present invention.
Figure 12:
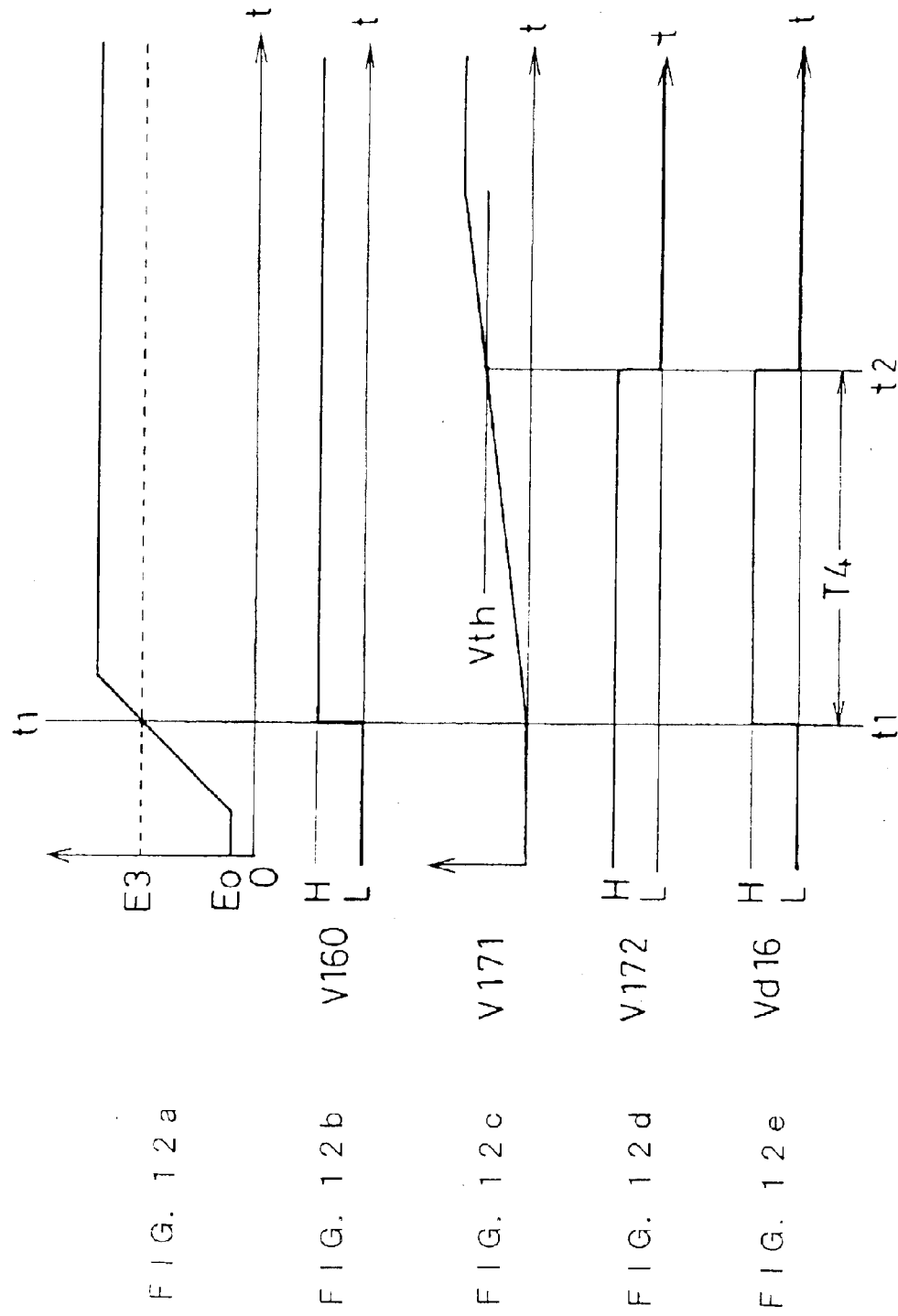
FIG. 12a to FIG. 12e are waveform diagrams showing the waveforms of signals at various parts of the DC-to-DC converter in accordance with the fifth embodiment of the present invention.

FIG. 11 is a circuit diagram of the DC-to-DC converter in accordance with the fifth embodiment of the present invention. Referring to FIG. 11, in the DC-to-DC converter in accordance with the fifth embodiment, the response speedup circuit 16 of the DC-to-DC converter in FIG. 9 of the fourth embodiment is replaced with another response speedup circuit 16a having an internal configuration different from that of the response speedup circuit 16. Since the other configurations are the same as those of the DC-to-DC converter in the fourth embodiment, their descriptions are omitted to prevent overlaps. The response speedup circuit 16a has a comparator 160 to which the reference voltage Er is applied to the inverting input terminal thereof and the detection voltage Ed3 is applied to the noninverting input terminal thereof. The response speedup circuit 16a also has a maximum ON time period setting circuit 17 and a discharging switch 161 to which a resistor 162 is connected in series. The maximum ON time period setting circuit 17 has an AND circuit 173. The output terminal of the comparator 160 is connected to one of the input terminals of the AND circuit 173. The output terminal of an inverter 172 is connected to the other input terminal of the AND circuit 173. The input terminal of the inverter 172 is connected to the output terminal of the comparator 160 via a resistor 170. A capacitor 171 is connected between the connection point of the resistor 170 and the inverter 172 and the circuit ground G. The resistor 170, the capacitor 171 and the inverter 172 constitute a delay circuit. The delay voltage V172 of the delay circuit is applied to the other input terminal of the AND circuit 173. A drive signal Vd16 output from the AND circuit 173 is applied to the discharging switch 161. One terminal of the discharging switch 161 is connected to the circuit ground G, and the other terminal is connected to the output terminal 50 via the resistor 162.

The operation of the DC-to-DC converter of the fifth embodiment shown in FIG. 11 will be described below referring to FIG. 12a to FIG. 12e. FIG. 12a to FIG. 12e are waveform diagrams showing the waveforms of signals at various parts of the DC-to-DC converter in this embodiment. FIG. 12a shows the change of the DC output voltage Eo, and FIG. 12b shows the change of the output V160 of the comparator 160. In addition, FIG. 12c shows the change of the terminal voltage V171 of the capacitor 171, FIG. 12d shows the change of the delay voltage V172 output from the inverter 172, and FIG. 12e shows the change of the drive signal Vd16 supplied to the discharging switch 161.

When the DC output voltage Eo rises and becomes higher than the third voltage E3 at time t1 owing to an abnormal operation or the like, the output V160 of the comparator 160 shown in FIG. 12b turns "H". At time t1, the capacitor 171 begin to charge the output V160 via the resistor 170. While the voltage V171 shown in FIG. 12c is lower than the threshold value Vth of the inverter 172, the delay voltage V172 of "H" is output from the inverter 172 as shown in FIG. 12d. The drive signal Vd16 output from the AND circuit 173 is "H". The AND circuit 173 accepts the output V160 being "H" and the delay voltage V172 being "H". Consequently, the discharging switch 161 turns ON. Depending on advancing of charging in the capacitor 171, the voltage V171 rises gradually. When the voltage V171 reaches the threshold value Vth of the inverter 172 at time t2, the delay voltage V172 output from the inverter 172 is inverted to "L". Hence, the drive signal Vd16 output from the AND circuit 173 turns "L", and the charging switch 161 turns OFF. The time period T4 from ON-state to OFF-state of the discharging switch 161 is set at a time period longer than the ON time period of the discharging switch 161 of the response speedup circuit 16 described in the fourth embodiment.

In the fifth embodiment, the maximum ON time period setting circuit 17 generates the delay voltage V172 delayed from the output V160 of the comparator 160 by the charging time period of the capacitor 171. The AND output of the output V160 and the delay voltage V172 is used as the drive signal Vd16 of the discharging switch 161. Hence, the "H" time period of the drive signal Vd16, that is, the ON time period T4 of the discharging switch 161, is limited to a predetermined value. In other words, a maximum limit can be provided for the ON time period T4. The maximum ON time period T4 of the discharging switch 161 should only be set at a time period during which the discharging switch 161 does not break even if the discharging switch 161 keeps its ON state when the DC output voltage Eo rises abnormally.

In the DC-to-DC converter in accordance with the fifth embodiment, by providing the limit for the maximum value of the ON time period of the discharging switch 161 as described above, the discharging switch 161 is protected so as not to break even if the discharging switch 161 turns ON when the DC output voltage Eo rises abnormally.

In the above description of the first embodiment to the fifth embodiment, a voltage up and voltage down converter including two switches has been described as a DC-to-DC converter capable of carrying out voltage step-up and voltage step-down. However, the DC-to-DC converter in accordance with the present invention is not limited to such a type of DC-to-DC converter. SEPIC and Zeta converters are also known as DC-to-DC converters capable of carrying out voltage step-up and step-down, and the present invention can also be applied to these converters. Furthermore, the present invention -can also be applied to all DC-to-DC converters, such as a step-up and step-down DC-to-DC converter comprising a step-up converter and a step-down converter combined in series or parallel.

What is claimed is:

1. A DC-to-DC converter comprising:
   switch sections for flowing and blocking a DC input current from an input terminal, an inductor for alternately storing and releasing electromagnetic energy generated depending on the current by turning ON and turning OFF of said switches, an error amplification circuit for outputting an error voltage by comparing a DC output voltage obtained by rectifying and smoothing a voltage generating at the output terminal of said inductor with a predetermined reference voltage, and a pulse-width control circuit for controlling turn-ON and turn-OFF of said switches on the basis of said error voltage, And for controlling said DC output voltage so as to be higher or lower than the voltage of said DC input and becomes equal to a predetermined output setting voltage, a switch connected across said input terminal and said output terminal of said DC-to-DC converter, a first comparator for comparing a first voltage lower than said output setting voltage with said DC output voltage and for obtaining an output of comparison result, a second comparator for comparing a second voltage lower than said DC input voltage with said DC output voltage and for obtaining an output of comparison result, and a drive circuit for receiving the output of said first comparator and the output of said second comparator, and for turning ON said switch when said DC output voltage is lower than said first voltage and said second voltage.

2. A DC-to-DC converter in accordance with claim 1, further comprising a voltage application section, to which the output of said first comparator is applied, for changing said error voltage so that said pulse-width control circuit turns ON and turns OFF said switches at the maximum duty ratios when said DC output voltage is lower than said first voltage.

3. A DC-to-DC converter in accordance with claim 1, wherein said drive circuit comprises a first maximum ON time period setting circuit for setting a predetermined maximum value at the ON time period of said switch.

4. A DC-to-DC converter in accordance with claim 1, further comprising:

a switch connected across said output terminal and the circuit ground of said DC-to-DC converter, and a third comparator for outputting the result of the comparison between said DC output voltage and a third voltage higher than said output setting voltage, wherein said switch is turned ON when said DC output voltage is higher than said third voltage.

5. A DC-to-DC converter in accordance with claim 4, further comprising:

an output voltage detection circuit including a plurality of resistors connected in series between said output terminal and the circuit ground of said DC-to-DC converter, among a first detection voltage, a second detection voltage lower than said first detection voltage and a third detection voltage lower than said second detection voltage, detected by said output voltage detection circuit, said first detection voltage and said reference voltage are input to said first comparator, said second detection voltage and said reference voltage are input to said error amplification circuit, and said third detection voltage and said reference voltage are input to said third comparator.

6. A DC-to-DC converter in accordance with claim 4, further comprising a maximum ON time period setting circuit for setting a predetermined maximum value at the ON time period of said switch.

7. A DC-to-DC converter for converting a DC input voltage applied to an input terminal and for outputting a desired DC output voltage from an output terminal comprising:

a switch for making or breaking the connection between said input terminal and said output terminal, and a control section, in which a first voltage lower than an output setting voltage used as a desired value of said DC output voltage and a second voltage lower than said input voltage are defined, for closing said switch when said DC output voltage is lower than said first voltage and said second voltage.

8. A DC-to-DC converter in accordance with claim 7, wherein, when said DC output voltage is lower than said first voltage, said control section controls said DC-to-DC converter so that the output thereof becomes the maximum.

9. A DC-to-DC converter in accordance with claim 7, further comprising means for limiting the ON time period of said switch to a predetermined maximum limit.

10. A DC-to-DC converter in accordance with claim 7, wherein a switch is connected across said output terminal and the circuit ground of said DC-to-DC converter, and said switch is turned ON when said DC output voltage is higher than a third voltage having been set at a value higher than said output setting voltage.

11. A DC-to-DC converter in accordance with claim 10, further comprising means, for limiting the ON time period of said switch at a predetermined maximum limit.

12. A DC-to-DC converter comprising:

switches for flowing and blocking current input from an input terminal, an inductor for storing and releasing electromagnetic energy generated depending on the current flown and blocked by said switches, a capacitor, charged by the current obtained by the storage and release of the electromagnetic energy of said inductor, for obtaining a DC output voltage, an error amplification circuit for comparing said DC output voltage with a predetermined reference voltage and for outputting an error voltage obtained as the result of the comparison, a pulse-width control circuit for applying pulse signals having predetermined duty ratios to said switches and for controlling said duty ratios so that said DC output voltage becomes a desired voltage on the basis of said error voltage, a comparator for comparing said DC output voltage with said predetermined reference voltage and for outputting a signal obtained as the result of the comparison when said DC output voltage becomes higher than said desired voltage, and a discharging switch for discharging said capacitor, said discharging switch being driven by the signal obtained as the result of the comparison by said comparator.

* * * * *